(12) United States Patent
Funk et al.

(10) Patent No.: US 9,739,635 B2
(45) Date of Patent: Aug. 22, 2017

(54) METHODS FOR IMPROVED HEADING ESTIMATION

(71) Applicant: TRX Systems, Inc., Greenbelt, MD (US)

(72) Inventors: Benjamin E. Funk, Hanover, MD (US); Dan Hakim, Silver Spring, MD (US); John Karvounis, Bowie, MD (US); Travis Young, Rockville, MD (US); Carole Teolis, Glenn Dale, MD (US)

(73) Assignee: TRX Systems, Inc., Greenbelt, MD (US)

( * ) Notice: Subject to any disclaimer, the term of this patent is extended or adjusted under 35 U.S.C. 154(b) by 823 days.

(21) Appl. No.: 13/915,998

(22) Filed: Jun. 12, 2013

(65) Prior Publication Data

US 2013/0332098 A1    Dec. 12, 2013

Related U.S. Application Data

(60) Provisional application No. 61/658,883, filed on Jun. 12, 2012, provisional application No. 61/783,908, filed on Mar. 14, 2013.

(51) Int. Cl.
*G01C 25/00* (2006.01)
*G01C 17/38* (2006.01)

(52) U.S. Cl.
CPC ............. *G01C 25/00* (2013.01); *G01C 17/38* (2013.01)

(58) Field of Classification Search
CPC .................. G01C 17/38; G01C 25/00

USPC ............... 702/92, 93, 104; 701/446, 510
See application file for complete search history.

(56) References Cited

U.S. PATENT DOCUMENTS

| | | |
|---|---|---|
| 7,587,277 B1 | 9/2009 | Wells |
| 8,370,097 B2 | 2/2013 | Patel et al. |
| 8,712,686 B2 | 4/2014 | Bandyopadhyay et al. |
| 9,062,971 B2* | 6/2015 | Dutta ............. G01C 17/28 |
| 2009/0254294 A1 | 10/2009 | Dutta |

OTHER PUBLICATIONS

U.S. Appl. No. 61/783,908, filed Mar. 14, 2013, Funk et al.

(Continued)

*Primary Examiner* — John H Le
(74) *Attorney, Agent, or Firm* — Baker & Hostetler LLP

(57) ABSTRACT

Methods for calibrating a body-worn magnetic sensor by spinning the magnetic sensor 360 degrees to capture magnetic data; if the spin failed to produce a circle contained in an x-y plane fit a sphere to the captured data; determining offsets based on the center of the sphere; and removing the offsets that are in the z-direction. Computing a magnetic heading reliability of a magnetic sensor by determining an orientation of the sensor at one location; transforming the orientation between two reference frames; measuring a first vector associated with the magnetic field of Earth at the location; processing the first vector to generate a virtual vector when a second location is detected; measuring a second vector associated with the magnetic field of Earth at the second location; and calculating the magnetic heading reliability at the second location based on a comparison of the virtual vector and the second vector.

17 Claims, 26 Drawing Sheets

(56) References Cited

OTHER PUBLICATIONS

Banjanovic-Mehmedovic et al.; "Hough Transform Based Correction of Mobile Robot Orientation"; IEEE Int. Conference of Industry Technology; 2004; pp. 1573-1578.

Dong et al.; "A Low-Cost Motion Tracker and Its Error Analysis"; IEEE Int. Conference on Robotics and Automation; 2008; pp. 311-316.

* cited by examiner

| Lat: 38° 59' 58" Lon: -76° 53' 2" Elev: 0.00 m | Declination + East - West | Inclination -+ Down -+ Up | Horizontal Intensity | North Component + North - South | East Component -+ East - West | Vertical Component -+ Down -+ Up | Total Field |
|---|---|---|---|---|---|---|---|
| 8/14/2009 | - 10° 51' | 66° 31' | 20,797.0 nT | 20,425.3 nT | -3914.5 nT | 47,877.2 nT | 52,199.0 nT |
| Change per year | - 0' per year | - 6' per year | 28.5 nT/year | 27.7 nT/year | -7.0 nT/year | -151.5 nT/year | -127.5 nT/year |

FIG. 3A

METHODS FOR IMPROVED HEADING ESTIMATION

CROSS REFERENCE TO RELATED APPLICATIONS

This application claims benefit under 35 U.S.C. §119(e) of Provisional U.S. Patent Application No. 61/658,883, filed Jun. 12, 2012, and of Provisional U.S. Patent Application No. 61/783,908, filed Mar. 14, 2013, the contents of which are incorporated herein by reference in their entireties.

GOVERNMENT RIGHTS

This invention was made with government support under W91CRB-09-C-0089, awarded by the US Army, and W31P4Q-12-C-0043, awarded by the Defense Advanced Research Projects Agency. The Government has certain rights in the invention.

TECHNICAL FIELD

The disclosure relates to systems and methods for locating, tracking and/or monitoring the status of personnel and/or assets, both indoors and outdoors, and more particularly in GPS denied environments.

SUMMARY

Methods are disclosed for calibrating in real-time a magnetic sensor that include at least the steps of spinning the magnetic sensor 360 degrees to capture magnetic data along the 360 degrees spun path; determining that the spinning failed to produce a circle that is contained in an x-y plane; fitting a sphere to the captured magnetic data; determining offsets based on the center of the sphere; and removing the offsets that are in the z-direction. Systems are disclosed for computing an indicator of a magnetic heading reliability of a magnetic sensor, including at least a processor; a memory communicatively coupled to the processor, and instructions causing the computing system to at least determine an orientation of the magnetic sensor at a first location; generate a filter that transforms the orientation between two reference frames; measure a first vector associated with the magnetic field of Earth at the first location; when a second location of the magnetic sensor is detected, process the first vector through the filter to generate a virtual vector; measure a second vector associated with the magnetic field of Earth at the second location; and calculate the indicator of the magnetic heading reliability at the second location based on a comparison of the virtual vector and the second vector.

BRIEF DESCRIPTION OF THE FIGURES OF THE DRAWING

FIG. 3A illustrates a magnetic field description of a geographic location;

DETAILED DESCRIPTION OF ILLUSTRATIVE EMBODIMENTS

To increase the achievable accuracy of systems that provide locations indoors or in other GPS denied environments, the computation of an accurate heading is a critical element. An estimate of globally referenced heading is necessary to initialize an inertial system's starting heading and for occasional heading drift correction. Magnetic measurements are extremely valuable in navigation systems for providing a global referenced heading that is not subject to the accumulation of error. However, several factors may cause the heading from a magnetic compass to become unreliable. These include sensor calibration errors, local sources of interference, and interference caused by the surrounding environment.

Embodiments disclosed herein are directed to techniques for the run time calibration of magnetic sensors, such as body-worn sensors, that enable local sources of interference to be calibrated out after mounting. Embodiments disclosed herein are also directed to techniques for computing an indicator of magnetic heading reliability, techniques of using the compass heading data to remove gyro heading drift, techniques for global rotation estimation using spatial magnetometer filtering, and techniques for limiting the solution space of constraint based on heading optimization.

Method for Body-Worn Magnetic Sensor Calibration

Techniques have been developed for performing calibration of magnetic sensors, such as the magnetic sensors in body worn devices or devices attached to some form of mobile object. There are typically two sources of calibration error in magnetometers: local disturbances from sources of flux rotating along with the sensor, called hard-iron errors, and environmental distortions to the earth's flux in the earth's coordinate frame, called soft-iron errors. Hard-iron errors are constant and manifest themselves in an offset of the magnetometer's output, and can therefore be compensated for with a one-time calibration. The normal procedure for calibration in 3-axes is to collect a series of readings while the magnetometer is rotated about all three axes. A sphere is fit to this data, and the center of this sphere determines the offsets.

For a mobile tracking system based on a mounted tracking unit, local disturbances are caused by the device's electronics and can also be caused by other items on the same platform. For example, if the device is mounted on a person, what the person is wearing or carrying with them could affect the sensor calibration. Because of this, it is most effective to calibrate the device once mounted, but at that point it may be difficult to rotate the device around all axes.

Figure 1:
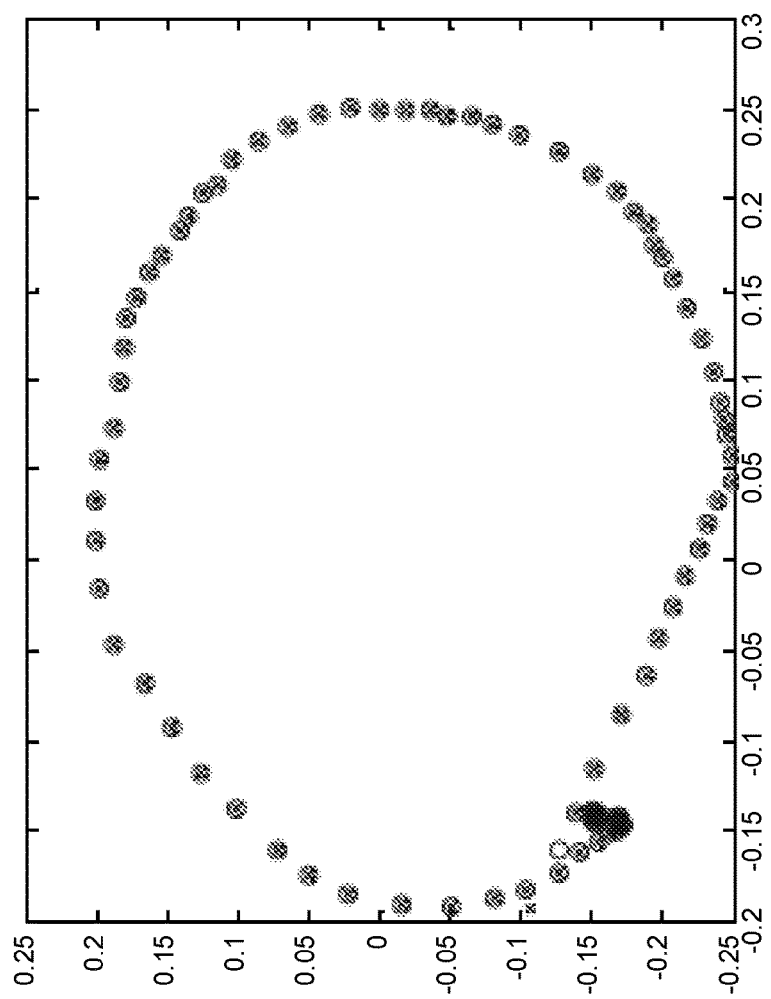
FIG. 1 is an illustration of an embodiment of location data points generated during a 360 degree spin of a magnetic sensor producing a deformed circle.
Figure 2:
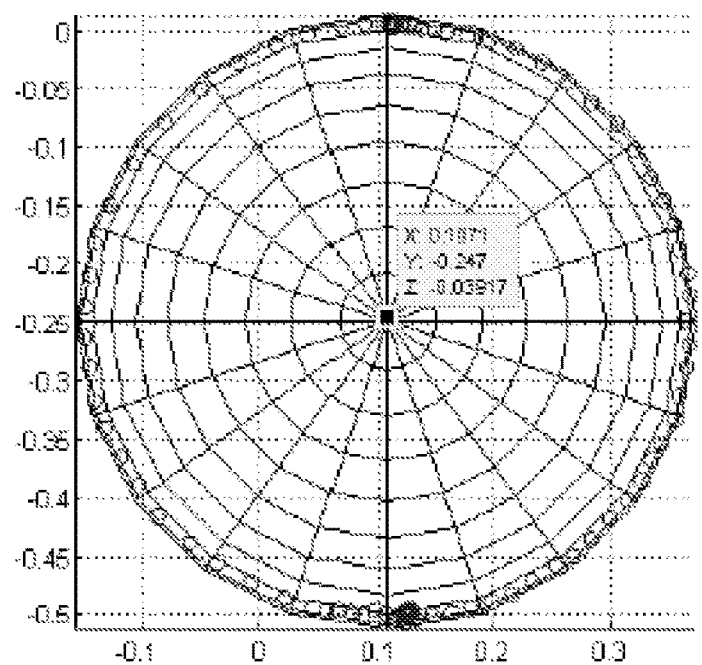
FIG. 2 is an illustration of an embodiment of uncalibrated and calibrated location data points from the sensor fit to a sphere.
Figure 2:
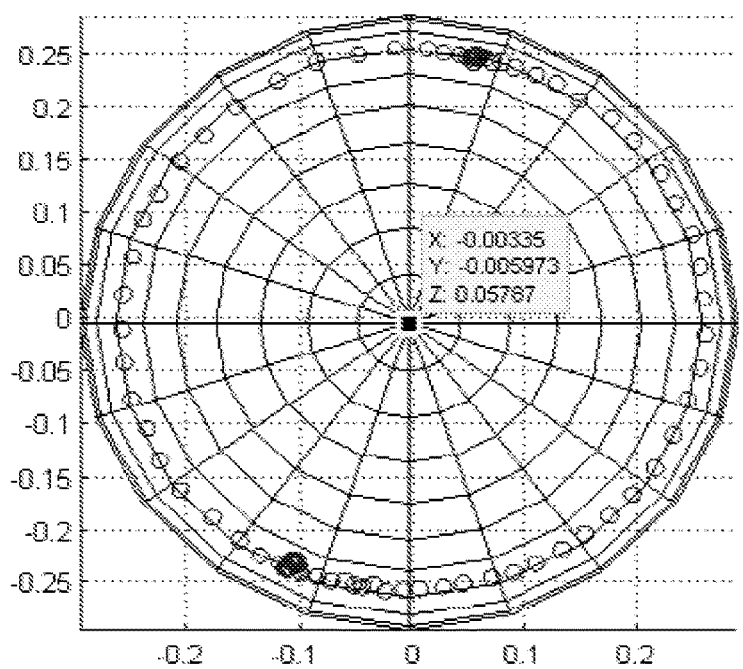

For example, in a personnel tracking system, the compass is used to determine a heading in the x-y earth frame so calibration in this plane is the most important. In order to calibrate the magnetometer in real-time while it is attached to the body, a person can spin 360 degrees, to produce a circle of location data points, which are mostly in the x-y earth frame. It is difficult for a person to remain perfectly in the level frame during such a spin, so a circle fit of the location data points in the x-y plane will often fail because the z-component is not constant, which produces deformed circles, such as illustrated in FIG. 1. In accordance with an embodiment herein, instead of attempting to fit the location data points to a circle, the data points are fit to a sphere, which produces good results in the x and y directions, but ill-conditioned results in the z direction. In such a case, the z-offset may be ignored while the x and y offsets (relative to the center of the sphere) are applied to fit the location data points toward the surface of the sphere, thereby calibrating the sensor. An example of uncalibrated and calibrated location data points in accordance with the above are illustrated in FIG. 2, where the uncalibrated result is shown above the calibrated result.

Method for Computing an Indicator of Magnetic Heading Confidence

In buildings, magnetic compass data is often affected by large magnetic disturbances due to structural and electromagnetic sources of magnetic field. However, there are also areas where the heading data is good. It is important to have an indication of when the compass heading is reliable so that it can be used for occasional reference when navigating in buildings and other GPS denied environments.

In order to provide a confidence level for magnetic field vector measurements, it must first be determined what a valid measurement should look like. There are several features of the Earth's magnetic field that are helpful for distinguishing that magnetic field from other sources. These include field magnitude, field stability, and magnetic inclination or "dip" angle. The magnetic inclination is the angle between the Earth's, magnetic field vector and the horizon (level plane) at a specific location. While each of these values slowly change over time, they may be considered constant for short (i.e., months) durations. The magnitude of the field measured on the Earth's surface varies according to location, but is often nominally considered to be about 0.5 gauss (50 micro Tesla). Declination for a given location describes the angle between magnetic North and true North. Because the declination value cannot be measured unless true North is known, it will not be very useful for determining field accuracy.

An experiment was performed in an attempt to find indicators that will help determine the validity of each heading measurement taken by a sensor. The premise of the experiment was that if a level of confidence with each heading measurement could be reliably reported, then it might be possible to more accurately make heading corrections. For the experiment, it was assumed that the sensor calibration was accurate and that compensation had been made for all local sources of error.

The experiment assumed that the location of the sensor was fixed, in this case in Greenbelt, Md., and that the magnetic sensor's calibration had been normalized such that the Earth's magnetic field would report a value of ~1.0 units. FIG. 3A of the Drawing provides a magnetic field description for the Greenbelt, Md. location, based on data from the National Oceanic and Atmospheric Administration Geophysical Data Center at the time of the experiment. As noted, Greenbelt, Md. is located at a magnitude of about 52.2 uT and an inclination of about 66.5 degrees. Declination at Greenbelt, Md. is about 10.8 degrees W.

The magnitude was calculated directly from the magnetic field sample. The inclination was determined by comparing the magnetic field vector to the vector as determined by the gyros and accelerometers sensors of an Inertial Navigation Unit (INU) worn by a subject. The field stability was calculated as a function of field strength and orientation compared to changing user location. Lastly, a comparison between magnetic field orientation and device orientation was used for validating the results.

Because field stability and sensor agreement metrics are only valid when the device bearing the sensor is moving, they will not contribute to the heading confidence result when the user is stopped.

Figure 3B:
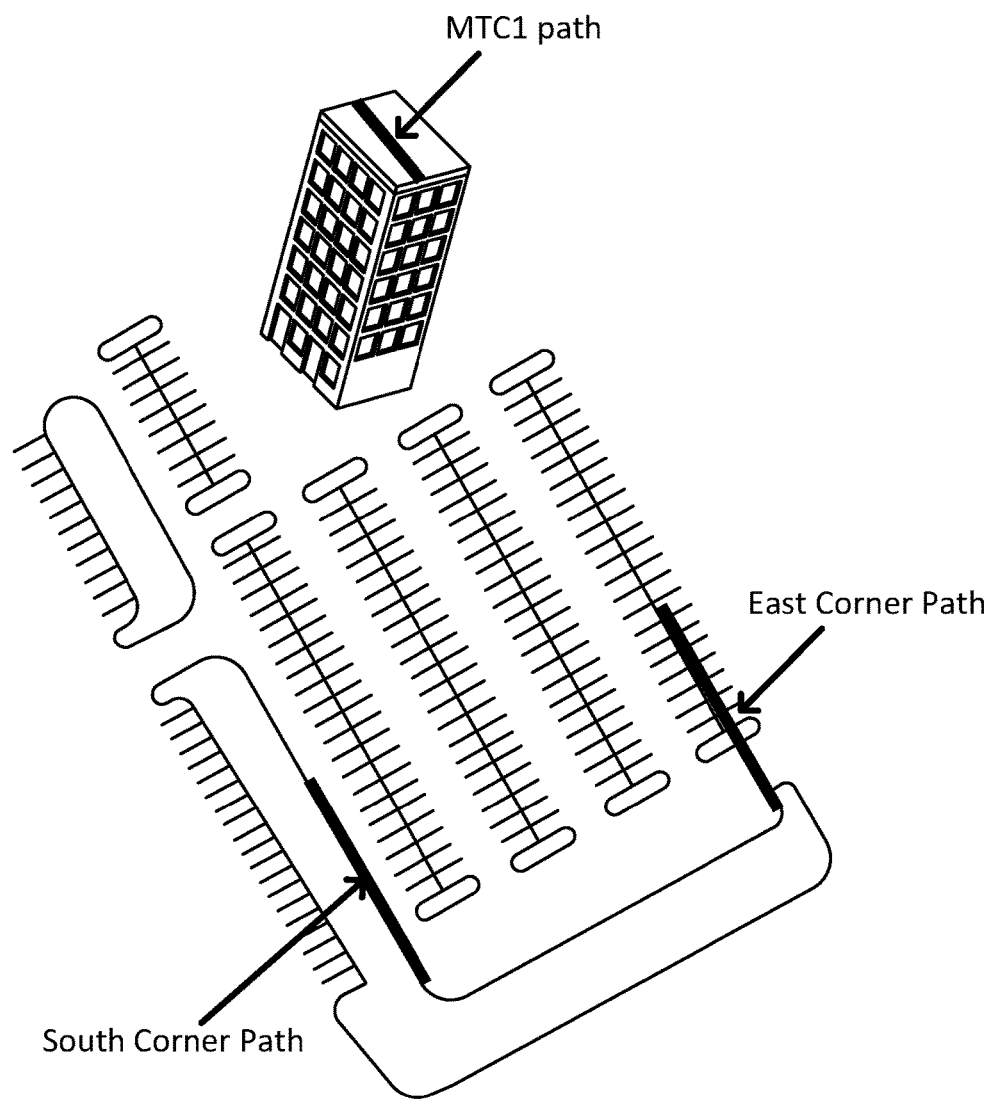
FIG. 3B is an illustration of three path locations near the geographic location of FIG. 3A.

Three test locations were chosen so that each may be used to demonstrate a different level of compass angle accuracy. As illustrated in FIG. 3B, while raw data was collected outdoors for the experiment, no public disclosure or use in public of any embodiment disclosed herein resulted from such outside activities. The first location, labeled "1) MTC1 path" in FIG. 3B, was along a line inside of an office building, on the 8$^{th}$ floor, where there were many source of severe interferences. The second location, labeled "2) East Corner Path" in FIG. 3B, was along a line near the east corner of a parking lot in front of the office building. The third location, labeled "3) South Corner Path" was along a line near the sour corner of the same parking lot.

At each location, the subject wearing the sensor walked 20-35 m along a straight path with a known heading of 340.8 (330+10.8), then stopped, turned around 180 degrees, and walked back to the start location with a known heading of 160.8 (150+10.8). Calibration was applied to raw data logs and data was transformed into navigation frame coordinates, which compensates for tilt. Field intensity, compass heading, and magnetic inclination were calculated for each test as follows:

$$\|M\| = \sqrt{m_x^2 + m_y^2 + m_z^2} \quad \text{Equation 1}$$

$$\text{Heading} = \tan^{-1}\left(\frac{-m_y}{m_x}\right) * \left(\frac{180}{\pi}\right) - 90 \quad \text{Equation 2}$$

$$\text{inclination} = \sin^{-1}\left(\frac{|m_z|}{\|M\|}\right) \quad \text{Equation 3}$$

Figure 4:
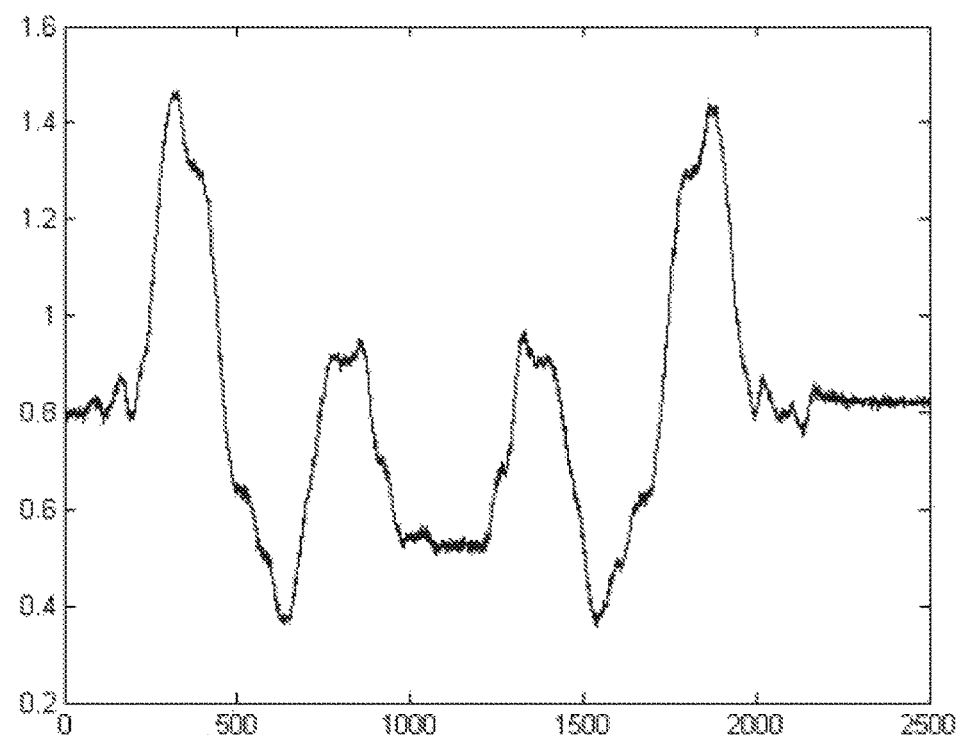
FIG. 4 is an illustration of an embodiment of a plot of magnetic field magnitude for a first location among the three path locations of FIG. 3B.
Figure 5:
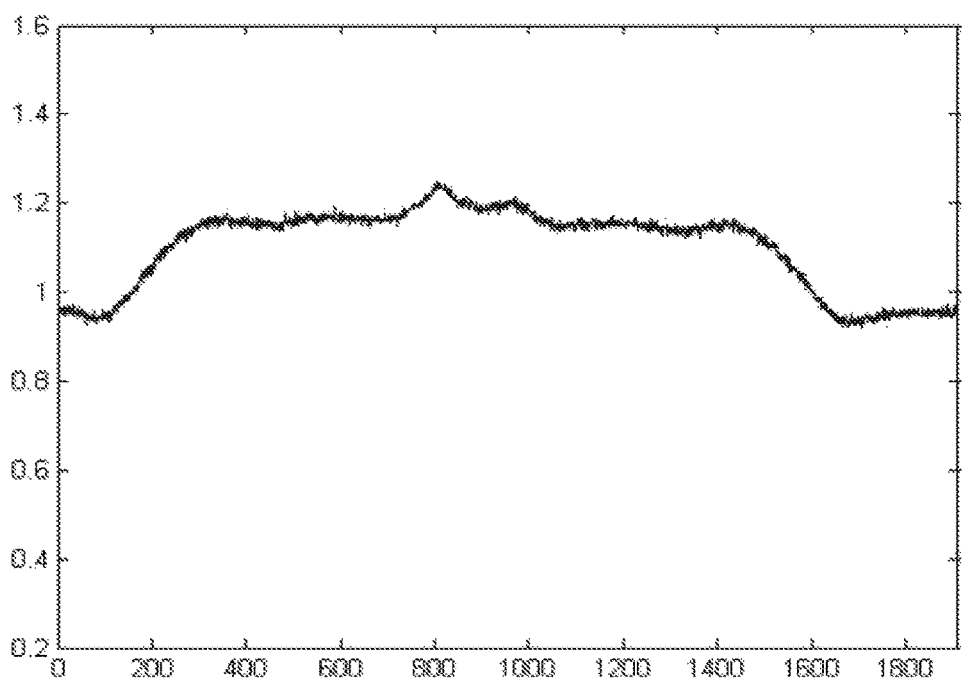
FIG. 5 is an illustration of an embodiment of a plot of magnetic field inclination for the first location of FIG. 4.
Figure 6:
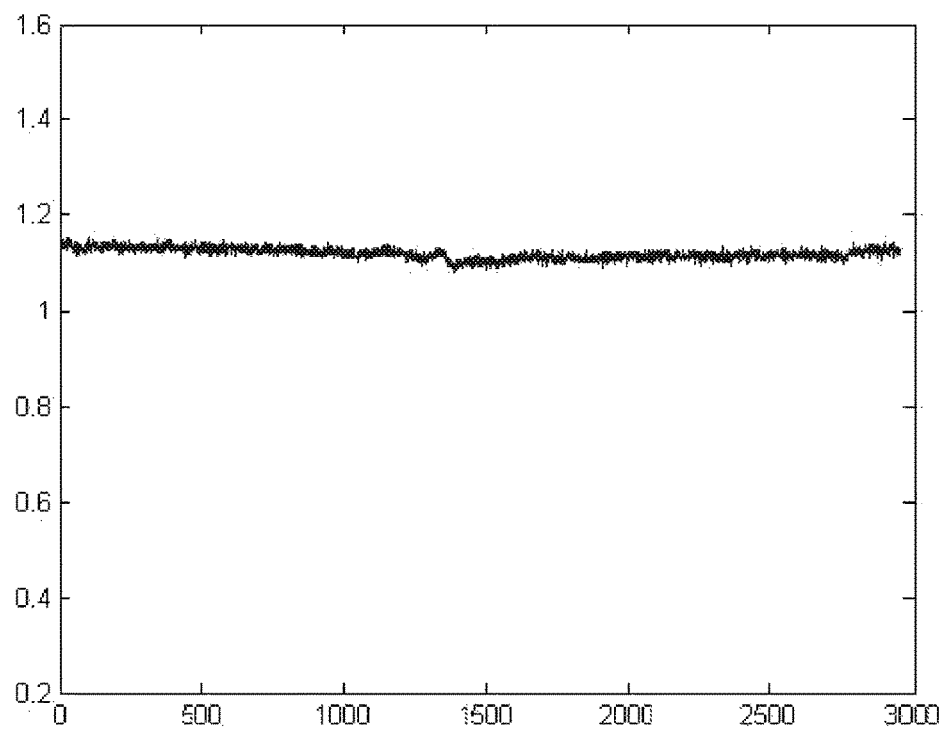
FIG. 6 is an illustration of an embodiment of a plot of the computer heading output for the first location of FIG. 4.
Figure 7:
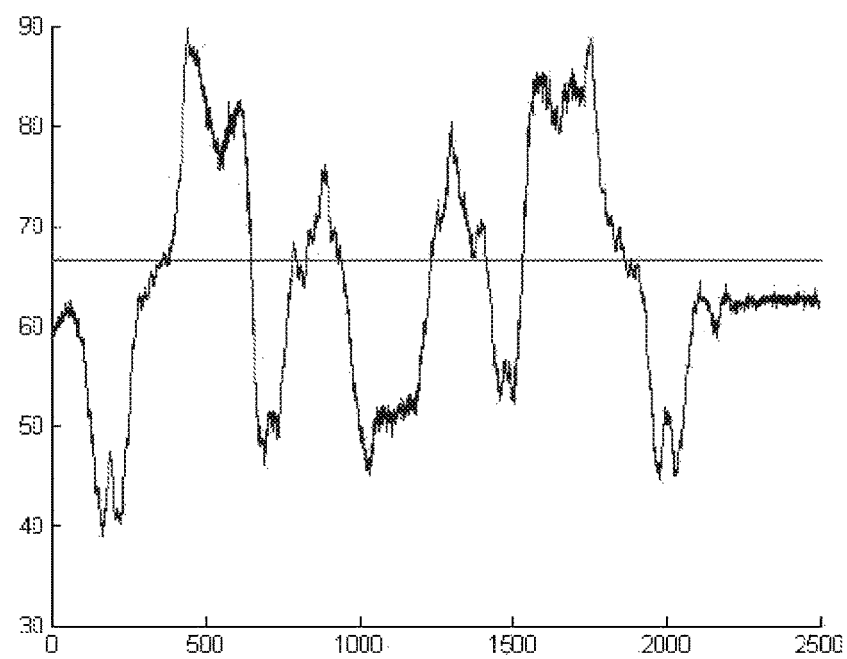
FIG. 7 is an illustration of an embodiment of a plot of magnetic field magnitude for a second location among the three path locations of FIG. 3B.
Figure 8:
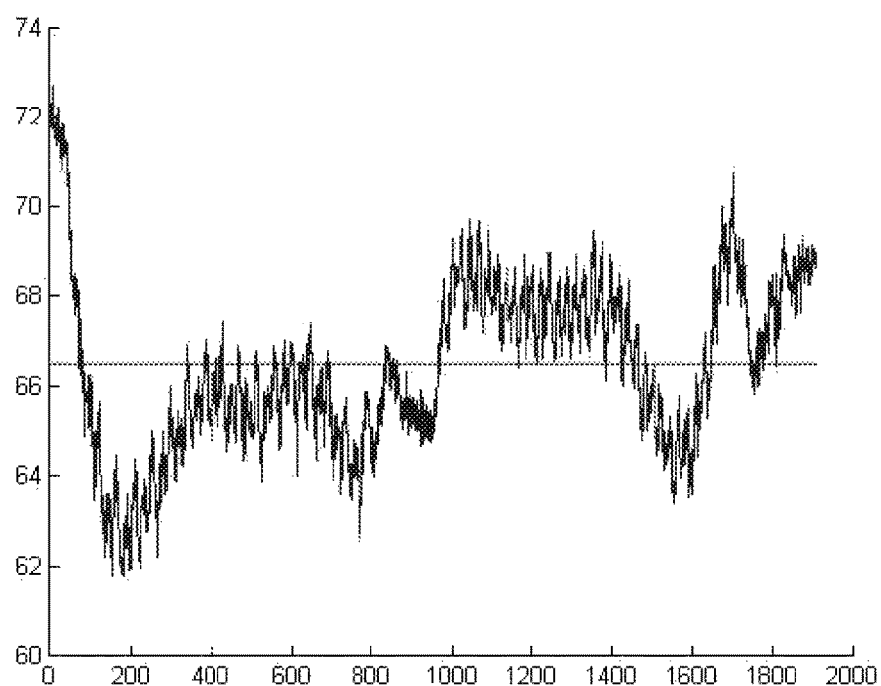
FIG. 8 is an illustration of an embodiment of a plot of magnetic field inclination for the second location of FIG. 7.
Figure 9:
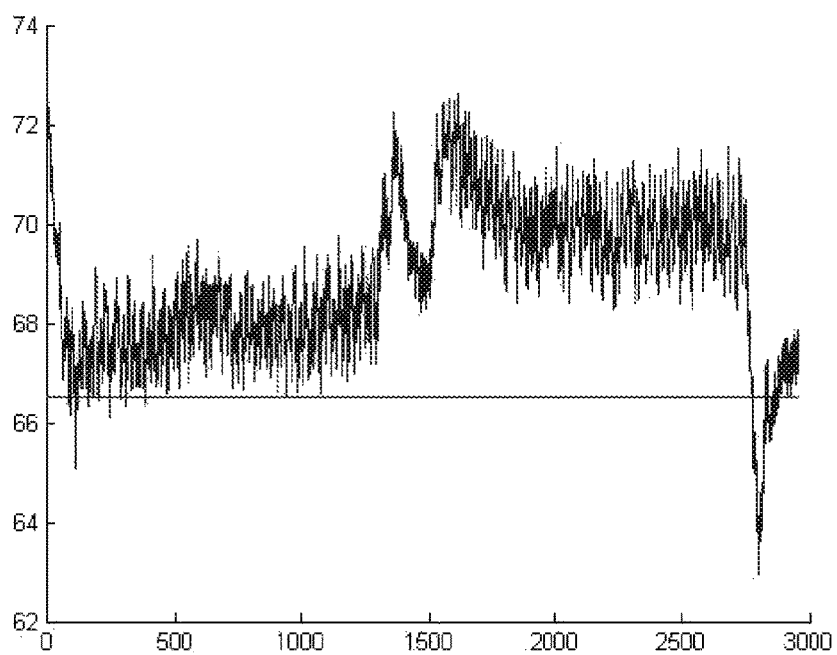
FIG. 9 is an illustration of an embodiment of a plot of the computer heading output for the second location of FIG. 7.
Figure 10:
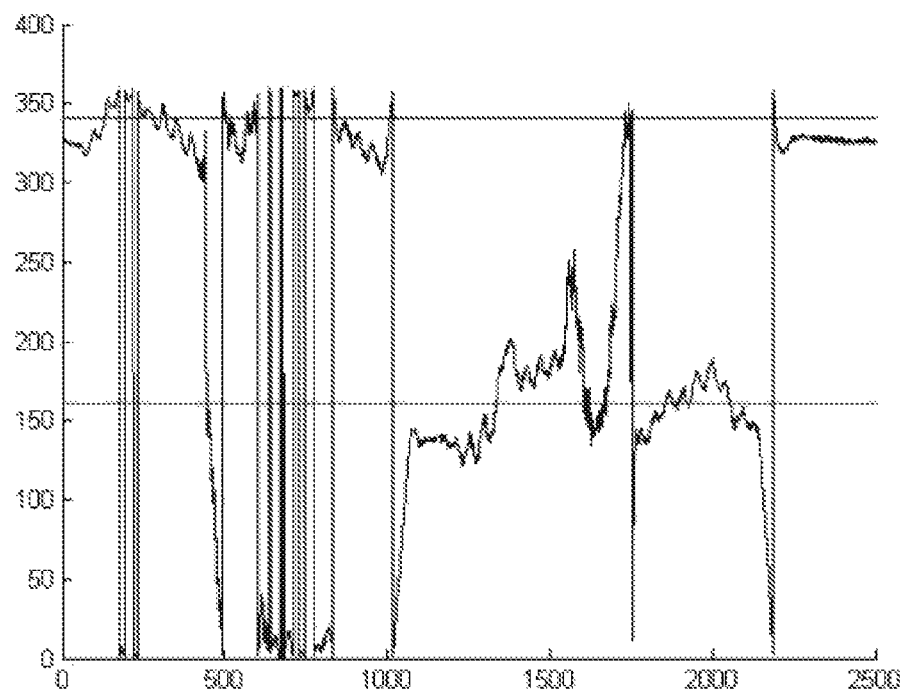
FIG. 10 is an illustration of an embodiment of a plot of magnetic field magnitude for a third location among the three path locations of FIG. 3B.
Figure 11:
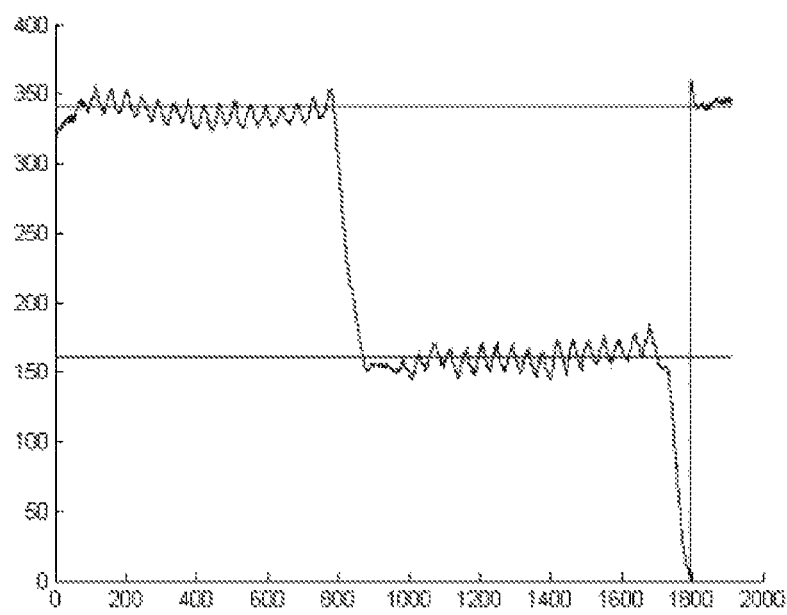
FIG. 11 is an illustration of an embodiment of a plot of magnetic field inclination for the third location of FIG. 10.
Figure 12:
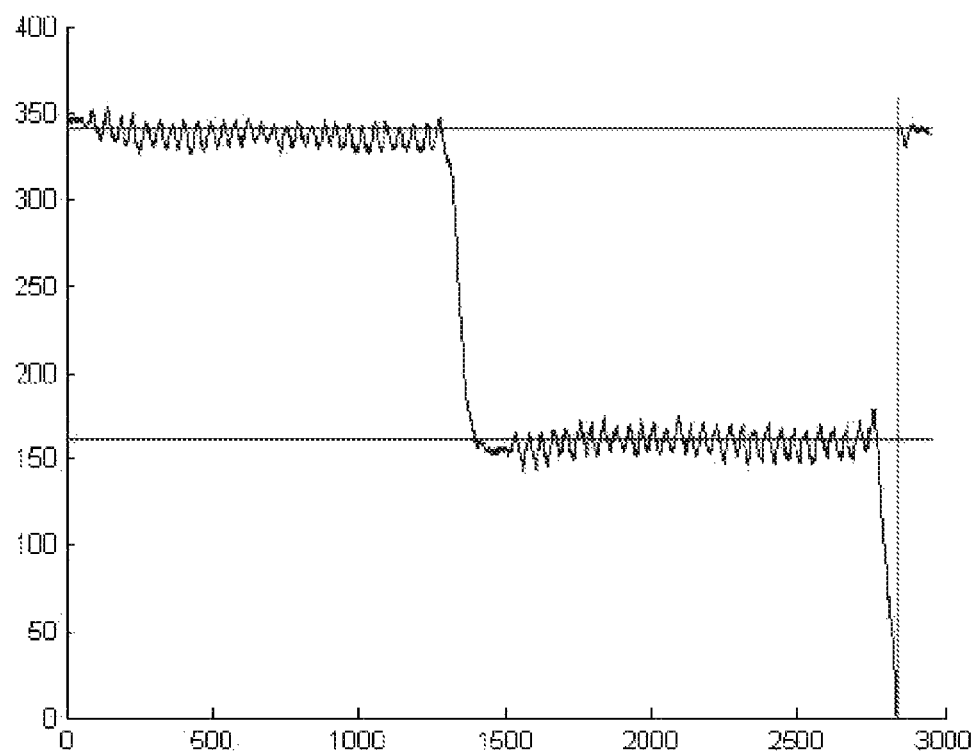
FIG. 12 is an illustration of an embodiment of a plot of the computer heading output for the third location of FIG. 10.

The results for the three test locations are summarized in FIGS. 4-12, where FIGS. 4, 7 and 10 correspond to the first location, FIGS. 5, 8 and 11 correspond to the second location, and FIGS. 6, 9 and 12 correspond to the third location. Each plots illustrated in these figures are for magnetic field magnitude and field inclination along with the computed heading for each given location. The undistorted earth magnetic field magnitude has been normalized to be 1, as shown in the FIGS. 4, 7 and 10. The undistorted earth magnetic field inclination of 66.5 degrees is indicated in FIGS. 5, 8 and 11. The true headings of 340.8 degrees, then 160.8 are indicated in the FIGS. 6, 9 and 12. An examination of the data illustrated in these plots reveals that the tests with the least error in field intensity (magnitude), FIGS. 5 and 6, and field inclination, FIGS. 8 and 9, generally produced a more accurate heading output, FIGS. 11 and 12.

Field Based Reliability Measure

The techniques for determining static reliability reflect the general finding that the compass is most accurate when magnitude and inclination measurements match their expected values. If the magnitude or inclination is within some percent of its expected value, then it is considered reliable. Outside of that range, the reliability is decreased as a function of the error. Listing 1 below gives an example of a source code implementation that assumes that the magnetic field magnitude has been normalized to 1.

Listing 1

```
float getStaticReliability(float3x1 mag)
{
        //Calculate Magnitude and Inclination.
        float magnitude = sqrt(float3x1_dot(mag,mag));
        float inclination = asin(abs(mag.z)/magnitude) * 180/M_PI;
        //Calculated difference between measured and expected values.
        float mError = abs(magnitude-1.0);
        float iError = abs(inclination-LOCAL_MAG_INCLINATION);
        //Normalize error to value between 0 and 1.
        //Assume data is unreliable outside of 0.5 magnitude and
25 inclination errors.
        if(mError>0.5)
                mError = 1;
        else
                mError = mError/0.5;
        if(iError>25)
                iError = 1;
        else
                iError = iError/25;
        //Note: if both measurments are as expect 1 is returned,
indicating highest confidence.
        return (1-mError)*(1-iError);
}
```

Virtual Orientation Sensor Based Reliability Measure

Figure 13:
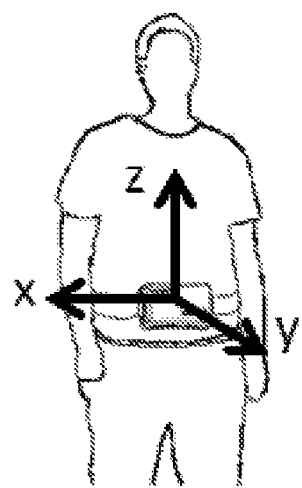
FIG. 13 is an illustration of an embodiment of reference frames for a sensor worn by a user.

In addition to the sensors, the Inertial Navigation Unit also contains an orientation filter algorithm that determines the orientation of the device based on input from the gyroscope and accelerometer sensors. The output of this filter is a quaternion that represents the transformation that is required to map vectors from one reference frame to another. With respect to a human subject, the "body frame's" coordinate system has its +x-axis pointing outward from the right side of the user's body and its +y-axis pointing outward from the user's stomach. The sensor's raw output is in body frame coordinates. As illustrated in FIG. 13, the "earth frame's" coordinates system has its +y-axis pointing horizontally toward the direction the device was facing when it was first turned on. Its +z-axis is pointing upwards directly opposite of gravity. Lastly, the "navigation frame's" +y-axis points the direction the user is facing but remains parallel to the horizon and its +z-axis points upwards, directly opposite of gravity. Each reference frame uses a right handed coordinate system.

Figure 14:
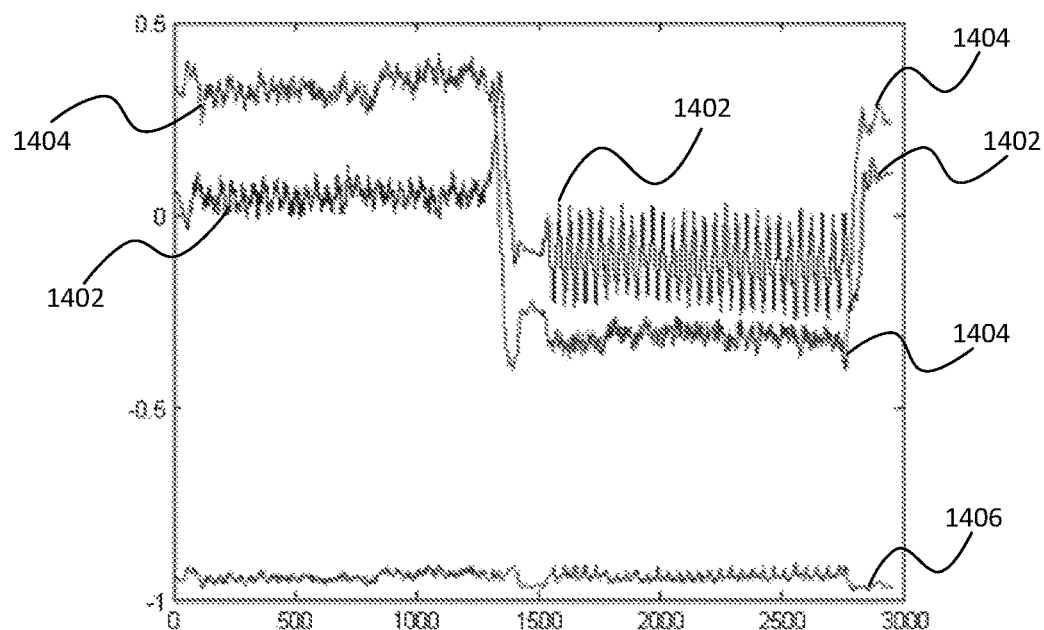
FIG. 14 is an illustration of an embodiment of a plot of virtual magnetic sensor data for the third location of FIG. 3B.
Figure 15:
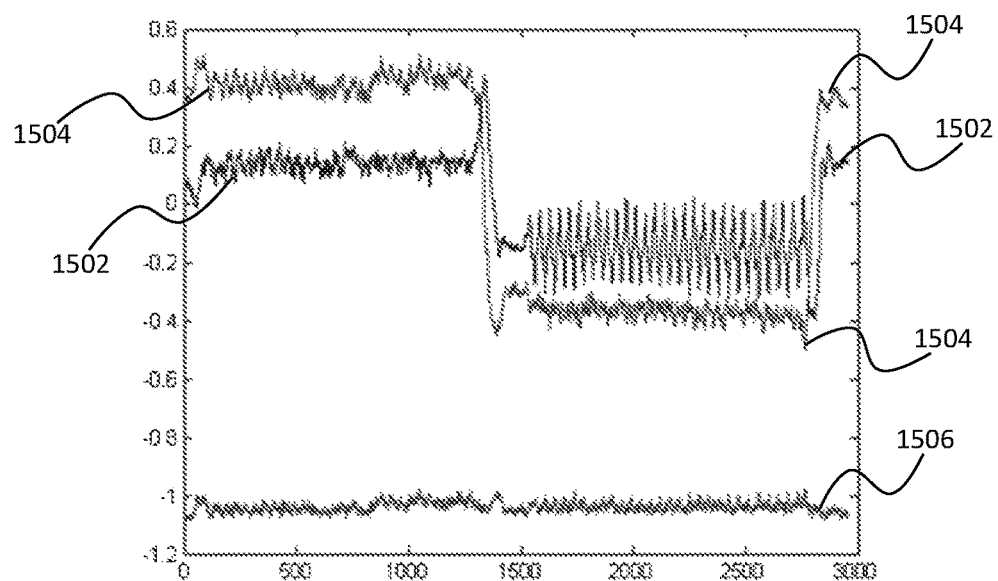
FIG. 15 is an illustration of an embodiment of a plot of the actual magnetic sensor data, for a calibrated body frame of reference, for the third location of FIG. 14.
Figure 16:
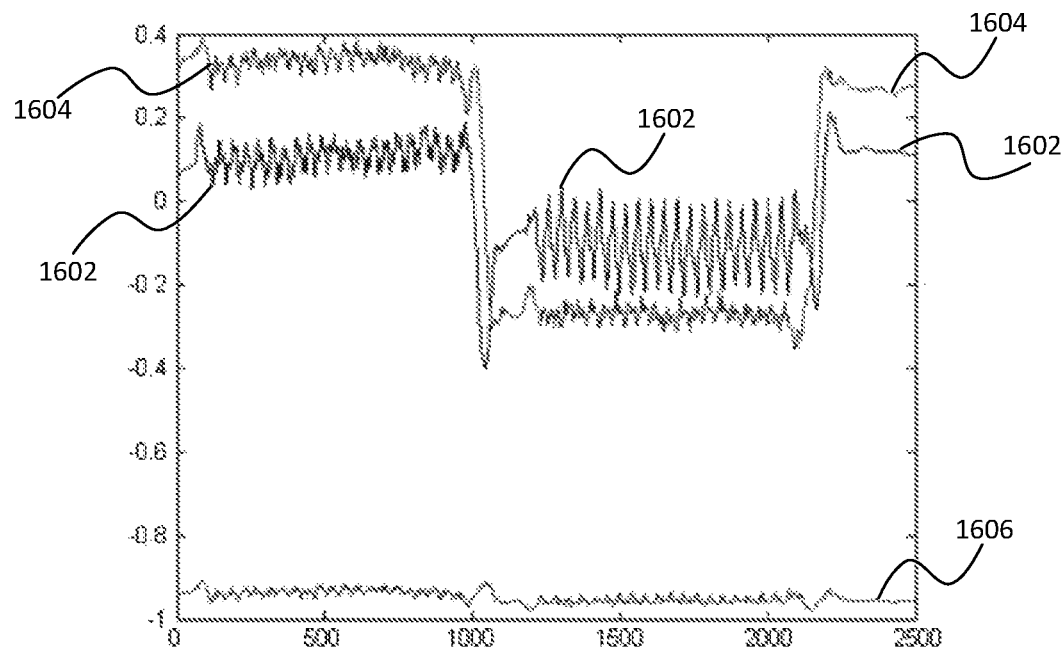
FIG. 16 is an illustration of an embodiment of a plot of virtual magnetic sensor data for the first location of FIG. 3B.
Figure 17:
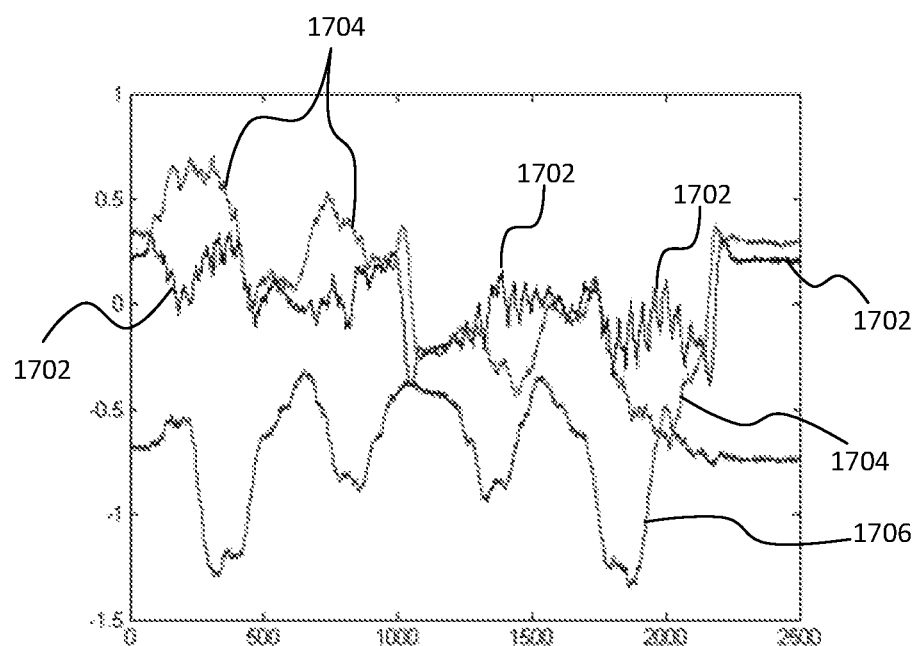
FIG. 17 is an illustration of an embodiment of a plot of the actual magnetic sensor data, for a calibrated body frame of reference, for the first location of FIG. 16.

In order to determine how the magnetic field vector is supposed to ideally move if its output were to match that of the orientation filter, an embodiment may utilize a virtual magnetic sensor output, such as illustrated in FIG. 14, where the x-axis is identified as 1402, the y-axis is identified as 1404, and the z-axis is identified as 1406. To do this, a vector was first defined that matched that of the magnetic field at the first sample of a test path. This vector was then transformed by the orientation filter output quaternion at each subsequent sample and the resulting vector was recorded. Assuming the orientation filter's output has zero error, this vector should match the output of an ideal magnetic sensor in a magnetic field with zero interference. As illustrated in FIG. 15, for the calibrated body frame, the resulting vector is plotted along with the data measured by the actual magnetic sensor for the third location of the experiment noted above, which was the path with the least error. In FIG. 15, the x-axis is identified as 1502, the y-axis as 1504 and the z-axis as 1506. A comparison of these results show that 1052 is very close to 1402, 1504 is very close to 1404 and 1506 is very close to 1406, which means that the virtual sensor is incredibly accurate at predicting the magnetic sensor output, which in turn indicates that the magnetic data from the sensor is likely valid. Note that the "virtual sensor" has no input from the magnetic field sensor except for its very first point and the magnetic sensor data shown has no input from the gyro or accelerometer sensors. In comparison, FIG. 16 is a plot of the virtual sensor for the first location of the experiment noted above, which was the path with the greatest error, where the x-axis is 1602, the y-axis is 1604 and the z-axis is 1606, while FIG. 17 is a plot of the calibrated body frame for the same path, where 1702 is the x-axis, 1704 is the y-axis and 1706 is the z-axis. The noted mismatch between these two plots indicates that the magnetic data should not be trusted as valid.

For the conducted tests described above, the angular heading results for the virtual sensor were very accurate and equal to or more accurate than the magnetic sensor. This was expected over the short term because when calculating heading, this technique is equivalent to that of integrating the rate gyro with its start value set to the correct heading. However, this cannot be relied upon in general because there are many situations where the first sample from the magnetic sensor will not be free of interference. Instead, it is necessary to slowly work to get an estimate of the correct magnetic heading over time.

As such, a feedback technique was developed that allows the "virtual" magnetic vector to move slowly over time toward the measured magnetic vector whenever the wearer is moving. If the wearer stops moving, the difference between the virtual magnetic vector and measured magnetic vector will be fixed, but not necessarily correct, so it is important not to allow this to move towards zero. The difference between the measured and virtual magnetic field vectors at each sample is calculated and serves as an indicator of how well the magnetic field vector is tracking the orientation of the device.

Figure 18:
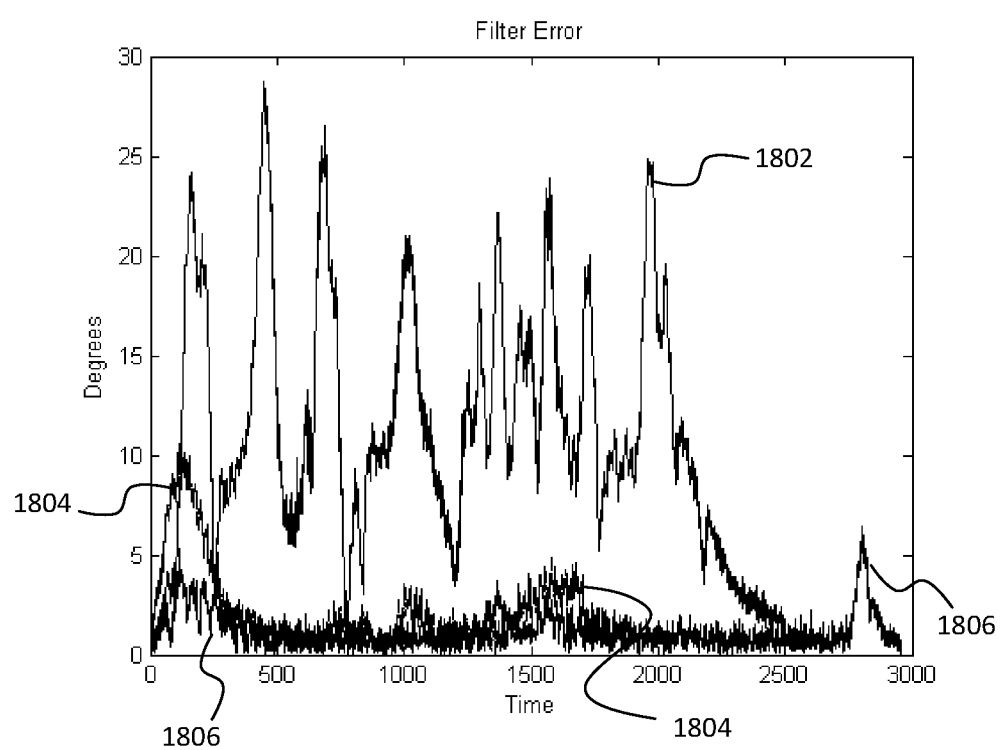
FIG. 18 is an illustration of an embodiment of a plot of the fusion angle for each of the locations of FIG. 3B.

The heading calculated from the "virtual" sensor vector is mostly controlled by the inertial orientation filter output, but is slowly "pulled" toward the measured magnetic field vector whenever the user is moving. This heading is referred to as the "fusion" angle because it is a measure of the angle between the virtual sensor vector and the measured results. FIG. 18 illustrates the fusion angle for each of the three test data sets, which test 1 is identified as 1802, test 2 is identified as 1804 and test 3 is identified as 1806.

From FIG. 18, it can be seen that the fusion angle is really an error measurement indicator of magnetic field reliability (low error, e→high reliability, r). Any function that maps this error information onto a weighting space is valuable for reducing the effect of poor heading data while improving the effect of good heading data. An example reliability function is defined as follows:

$$r = \begin{cases} 100 - e^2 & e < 10 \\ 0 & e \geq 10 \end{cases}$$

Method for Drift Estimation and Removal

Figure 19:
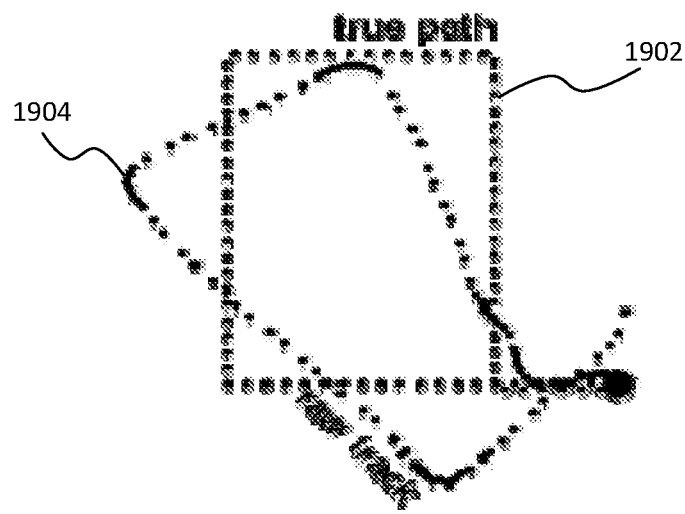
FIG. 19 is an illustration of an embodiment of a plot of a true path versus an inertial path estimate with uncompensated bias.

A gyro has small amounts of bias that cannot be corrected by calibration. This turn-on bias is randomly produced at initialization. There is also a lower level of in-run drift that could be caused by temperature variation, but for purposes of the present disclosure, bias is assumed to be fairly constant over the short term. This bias is presented in the computed path as drift. For example, in FIG. 19 the effect of uncompensated z-axis gyro bias on a path estimate is illustrated, where the true path is 1902 and the uncompensated raw computed path is 1904. For purposes of the present disclosure, this drift is referred to herein as inertial drift.

Despite the inertial drift that is apparent over a longer period of time, over a very short period of time, the gyro is accurate. In this regard, "short" is relative to the quality of the gyroscope, wherein low commercial grade gyros drift rather quickly relative to military, navigation and tactical grade gyros. For example, while the gyro heading may drift over a long straight path, a gyro is typically a good indicator for turning, since turns occurs over a relatively short time. A magnetic sensor, on the other hand, provides angle with absolute reference in presence of a "clean" Earth field, but if the compass calibration is not good, a turn may result in the compass heading and gyro heading changing by different amounts; the larger the change in heading, the larger the difference will be. With these issues in mind, compass/gyro fusion algorithms can be developed to use the best properties of each sensor to eliminate drift and allow the system to maintain good absolute heading accuracy.

Figure 20:
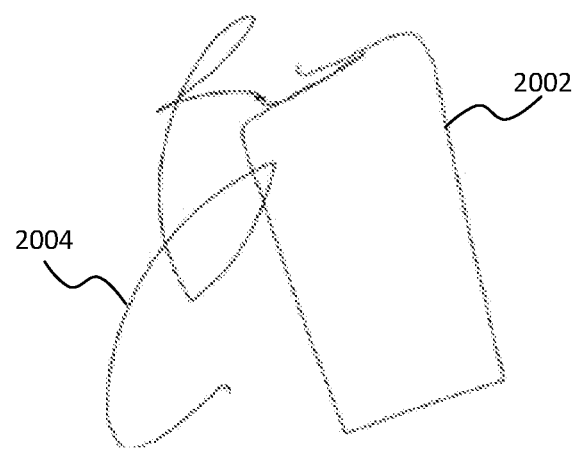
FIG. 20 is an illustration of an embodiment of a plot of a high drift path versus an inertial path estimate with uncompensated bias.
Figure 21:
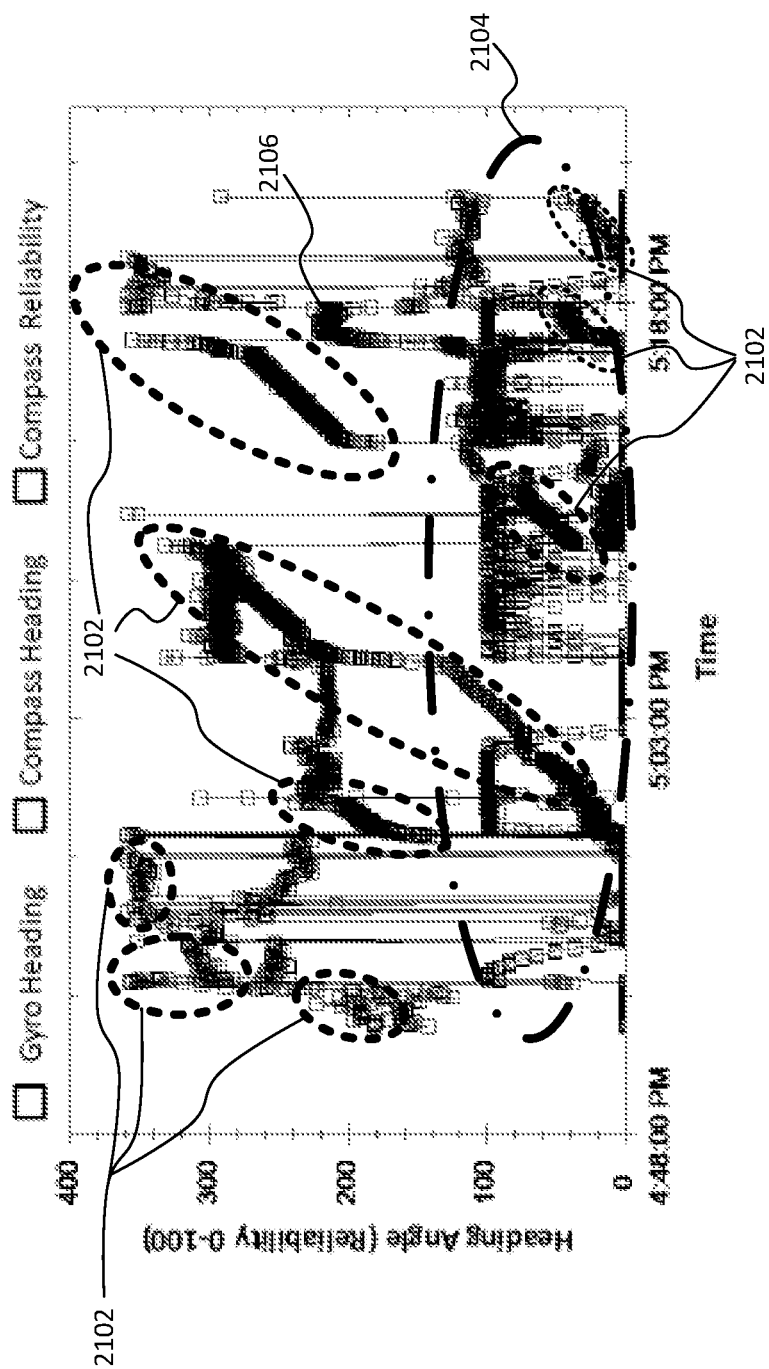
FIG. 21 is an illustration of an embodiment of a plot comparing a gyro heading, a compass heading and compass reliability for an example path.

When the magnetic field data is undisturbed and the sensors are properly calibrated, small changes in inertial heading should match the changes in magnetic field heading. Despite environmental disturbances in magnetic field measurements, for persons or assets moving around in the environment (even in magnetically poor environments, such as in buildings), the relationship between the compass readings and gyro rate estimates can usually be discovered. Eliminating the gyro bias enables longer duration GPS denied tracking As disclosed herein, a technique has been developed for drift estimation and removal that accounts for issues that may be encountered when compass calibration may be poor. An example illustrated in FIG. 20 demonstrates the output of various processing steps based on a path with significant drift to exaggerate the issues. FIG. 20 shows path data 2002 with compensation for drift and path data 2004 without drift compensation, where the drift is approximately −0.37 degrees/second. FIG. 21 shows the sensor (gyro and compass) heading angle and reliability data for the example path illustrated in FIG. 20 over a 30 minute period. The gyro heading is identified as a series of small square markings on the graph generally enclosed within dashed lines 2102. The compass reliability is also identified as a series of small square markings (largely grouped between 0 and 100) on the graph, which are generally enclosed within the dashed-dotted lines 2104. The compass heading is identified as the other small square markings 2106 on the graph.

In this example, the focus was on removing drift in the z-axis gyro using navigation frame magnetic heading, but the technique applies to drift removal in any axis. The technique has the following steps:

Step 1: Based on the "compass reliability" indication described above, filter out compass data with low reliability.

Step 2: Transform the gyro data and compass data into the navigation frame and compute compass heading minus the gyro heading, which is illustrated as 2202 in FIG. 22. The slope of this line, gyro minus compass (Gyro-Compass) 2202, can be attributed to drift.

Step 3: Compute and remove the average drift. To do this, best fit lines may be computed using y=mx+b, were m is the slope and b is the intercept mod 360. This may be accomplished by a variety of techniques. In the illustrated implementation, the Hough transform is used to find the lines.

Figure 22:
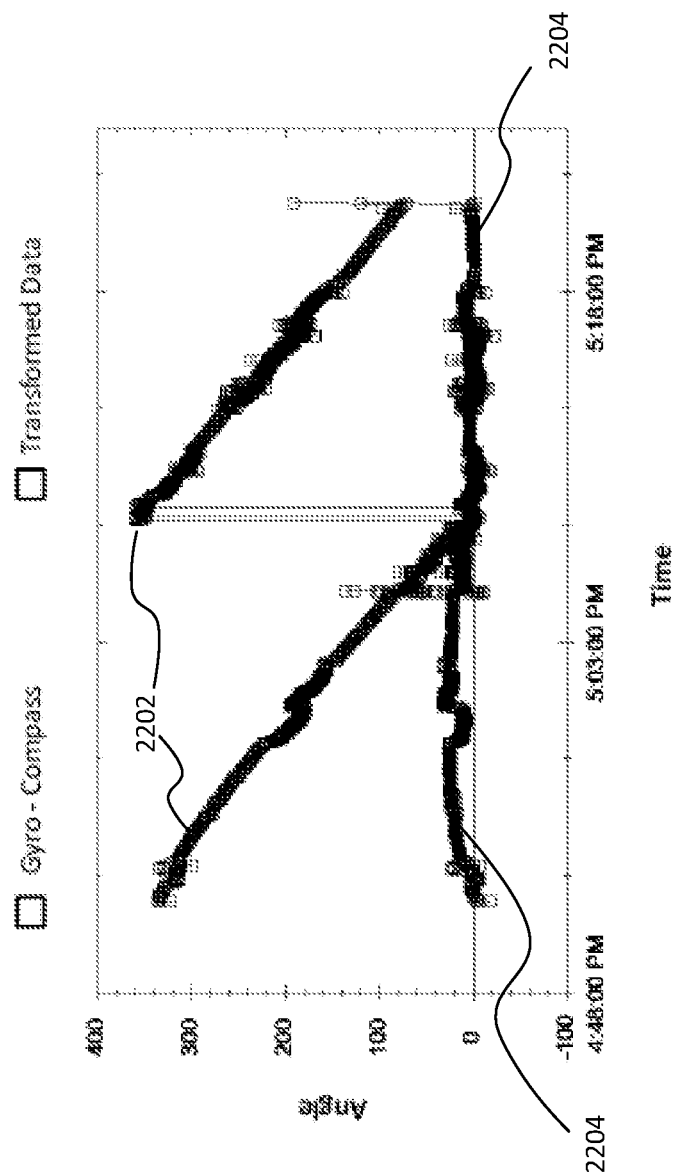
FIG. 22 is an illustration of an embodiment of a plot comparing a gyro minus compass heading and transformed data for the example path of FIG. 21.

Using the average slope, $m_1$, and intercept across all lines, the drift is subtracted off to leave the transformed data 2204, as shown near the bottom of the graph in FIG. 22. The transformed data 2204 should be approximately linear. In the case where the compass calibration is poor, the transformed data would have lines with similar slope but with varying offset (not an issue in this example).

Step 4: To account for improper compass calibration, the compass data may be sorted into bins based on compass angle. For each bin, a weighted best fit line for compass minus gyro 2202 is computed. The weight in the computation is based on the compass reliability, such as compass reliability 2104 from FIG. 21. The slope for each of these lines represents an adjustment to the computed drift from the previous step. The drift may vary slightly from bin to bin. The median slope, $m_2$, represents the drift adjustment and the median average deviation represents the accuracy of the computation. The final drift estimate=$m_1+m_2$.

The standard deviation of the transformed data, $\sigma_m$, provides a measure of potential drift variation.

In performing the steps set forth above for removing drift in any axis, several implementation considerations may need to be considered. First, when the posture of the person or asset changes, the z-axis gyro in the navigation frame uses a different physical gyro. This different gyro has a different drift rate. The technique can be restarted when significant orientation changes are detected to separate drift calculations depending on posture.

Second, sudden errors in gyro angle (for example, caused by gyro rate saturation) will cause an offset in the gyro-compass plot at the time of the saturation. Thus, the line will no longer be continuous. These saturations of the gyro can be detected and the algorithm restarted to remedy this.

Third, drift computation is most accurate when the device is very still. This is because when the device is still, drift can be computed independent of any variations in the compass (such as poor calibration) and independent of variations in the magnetic field. A method has been implemented to detect a strict "no motion" condition by requiring that the accelerometer and gyroscope variations remain below a certain threshold. Then, if no motion is maintained over a certain period of time the drift can be precisely computed by computing the bias terms such that the gyro computed headings remain constant over the same period. The resulting heading drift can be computed from the slope of the best fit line of computed heading over the period, $m_s$ which will be approximately 0. The variation of the data from 0, $\sigma_s$, can be used for predicting possible heading errors.

Fourth, when the user is wearing the device, periods of walking may be interspersed with periods of relative stillness. As pointed out above, because this computation is independent of the compass, during these periods of stillness, accurate gyro drift can be computed even in poor magnetic field conditions if these periods of stillness last beyond a threshold. Drift computed during periods of stillness should be more accurate than drift computed during motion, so this drift computation could be used to set/reset drift or this term could be very heavily weighted in a weighted average drift computation relative to drift computed as a function of the gyro-compass heading during motion. For example, the final drift might be $m_1+m_2+Wm_s$ where $m_1+m_2$ are drifts computed during motion, $m_s$ is computed while the user is still, and the weight $W \gg 1$.

Lastly, extreme magnetic variations can cause the system to calculate incorrect drift rates. Techniques for filtering magnetic data as discussed in the section above entitled "Method for Computing an Indicator of Magnetic Heading Confidence" may be used to minimize the effect of magnetic disturbances. If incorrect estimates are computed, they are generally unstable and can be detected by comparing drift calculations that have been computed in succession; calculate drift, apply drift, recalculate drift, obtain a new drift, and so on. If the new drift is not a small number, then the original drift estimate was poor. If after several drift estimates, the drift estimation does not approach zero, then the calculations are too scattered to be reliable and should not be used. The above described drift compensation technique has been able to correct drift of up to 0.75 degrees per second. If there are poor magnetic conditions, it may not be able to estimate drift, but as time progresses the estimation capability may improve, as long as there are some areas with a good or fairly good magnetic field.

Drift Engine Integrity Check via Pseudo Entropy

In an embodiment, a pseudo entropy computation is utilized to provide a confidence in the drift number described in the above drift estimation or any other drift estimation technique. In accordance with this embodiment, when drift is compensated, this generally increases "order" in the path (for example, segments overlap) and thereby reduces entropy.

It is often clear from visual inspection of a path whether the drift corrections "look good" even without having access to the ground truth. Pseudo entropy provides a means for quantifying good drift correction, versus bad drift correction, with respect to the original path without having access to ground truth. The pseudo entropy is defined by:

$$E=(w1*\text{Path Volume}+w2*\text{Path Occupancy})/(\text{Path Length})+w3*(\text{Line Factor})$$

where w1, w2, and w3 are weighting constants which are respectively 10, 20, and 1/20, in this embodiment.

The first term rewards paths that overlap. The Path Volume is the convex hull of the set of path points. The Path Occupancy is computed by taking a fixed volume around each path point (for example 1 m³ in this embodiment) and then computing the union of the volumes for the path. The Path Length is the length of the path.

The second term rewards paths that have straight segments. The Line Factor can be implemented in a variety of ways. For example, straight lines could be rewarded by performing a linear regression on the set of path points within some time before and after the current path point (30 seconds in this embodiment) and then summing the residual errors over this set of points from the line. This can be done for select path points and the number errors summed. In this embodiment, the computation may be done at each path point. Another embodiment may reward straight lines grouped into fewer heading directions. This embodiment may be implemented using the Hough transform (a standard transform in image processing for finding dominant lines in images). The number of dominant lines found with different angles is used as the line factor.

Figure 23:
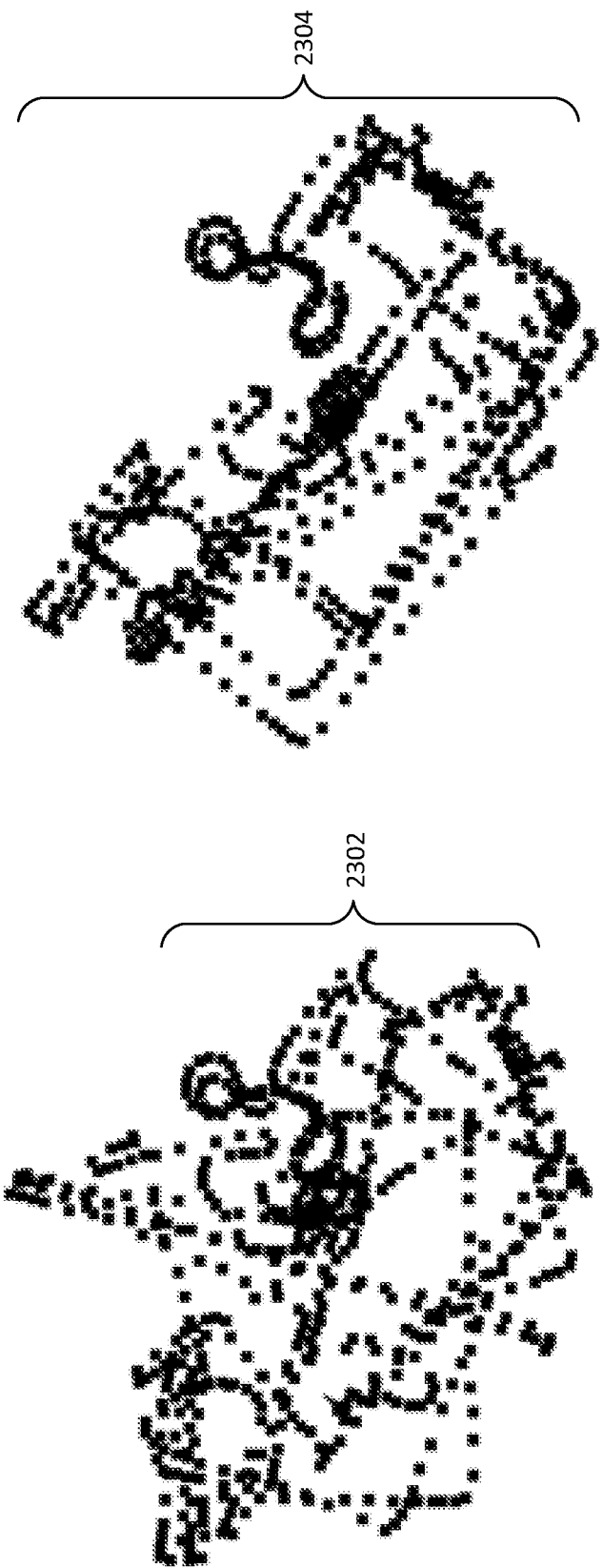
FIG. 23 is an illustration of an embodiment of a plot comparing a first path and a drift corrected version of the first path where entropy decreases.
Figure 24:
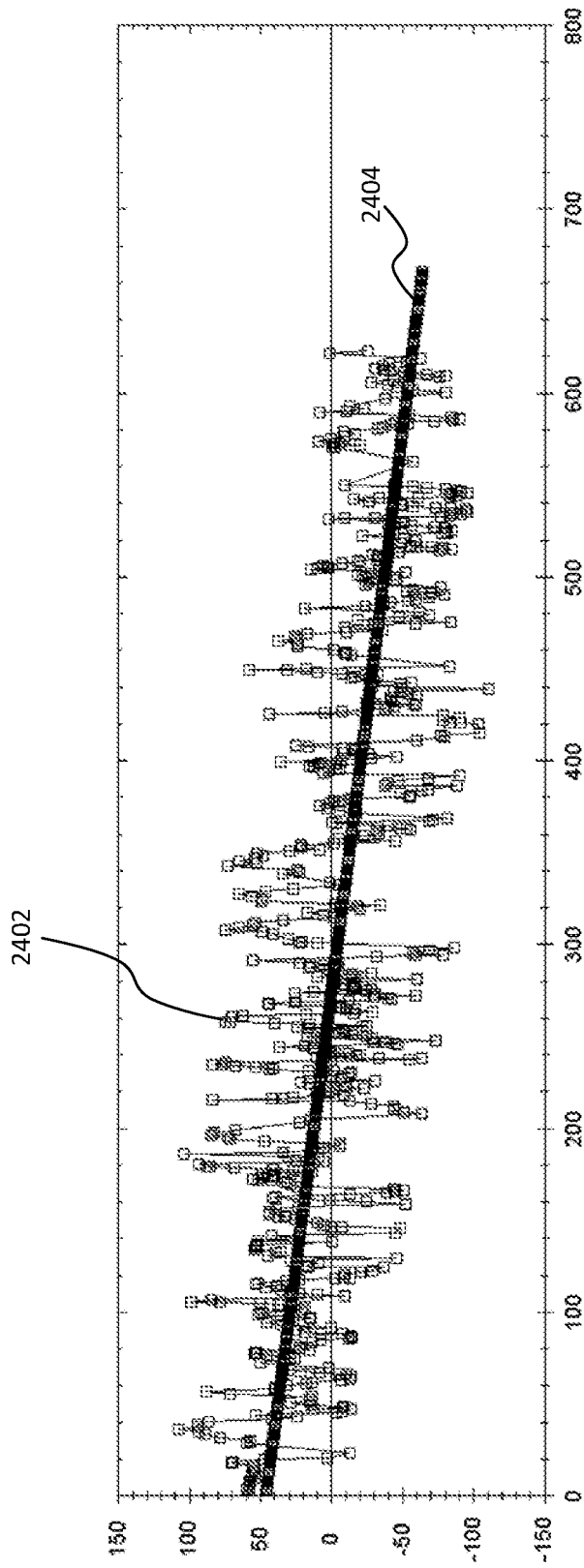
FIG. 24 is an illustration of an embodiment of a plot comparing a gyro minus compass heading and a drift estimate for the path of FIG. 23.
Figure 25:
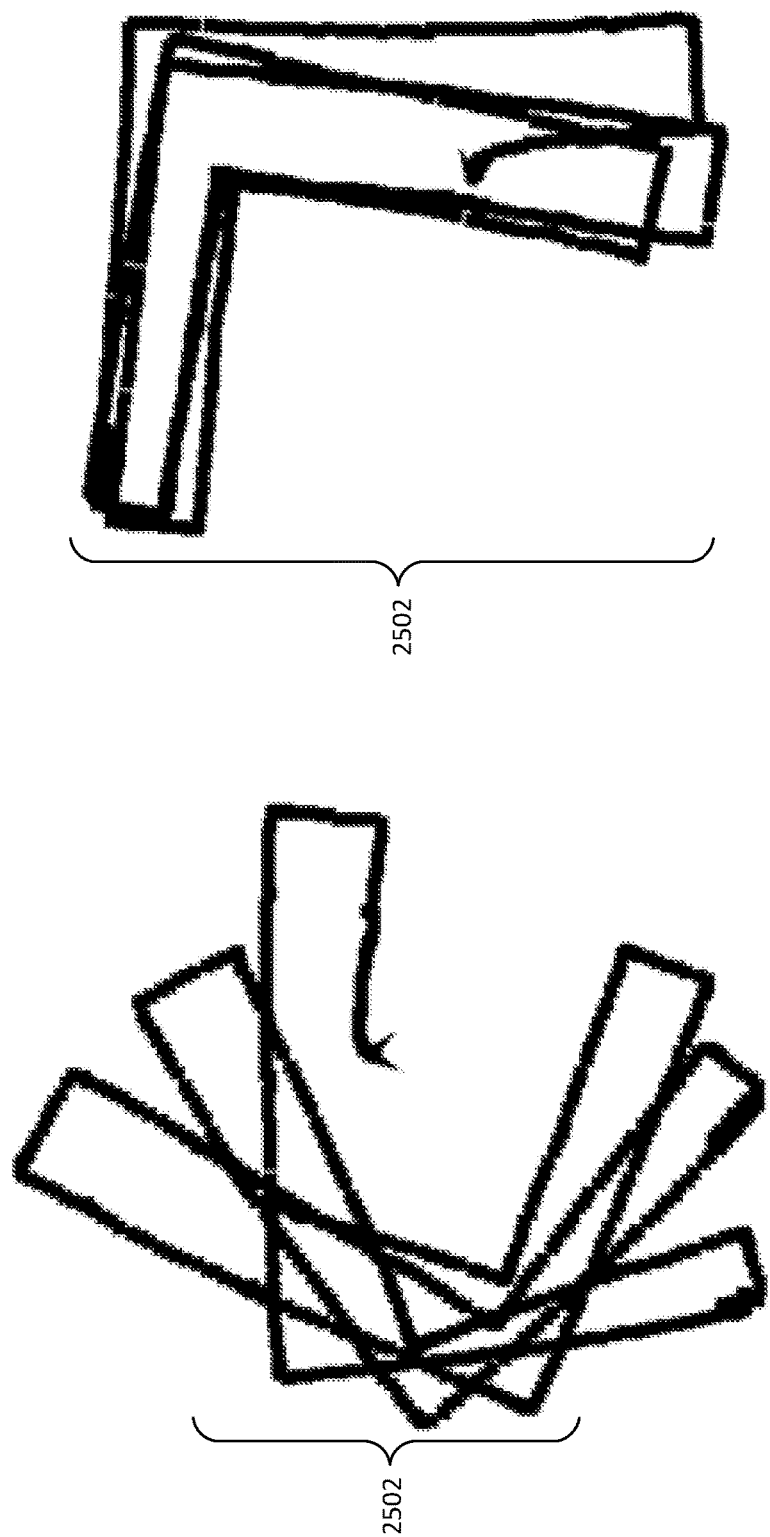
FIG. 25 is an illustration of an embodiment of a plot comparing a second path and a drift corrected version of the second path where entropy increases.
Figure 26:
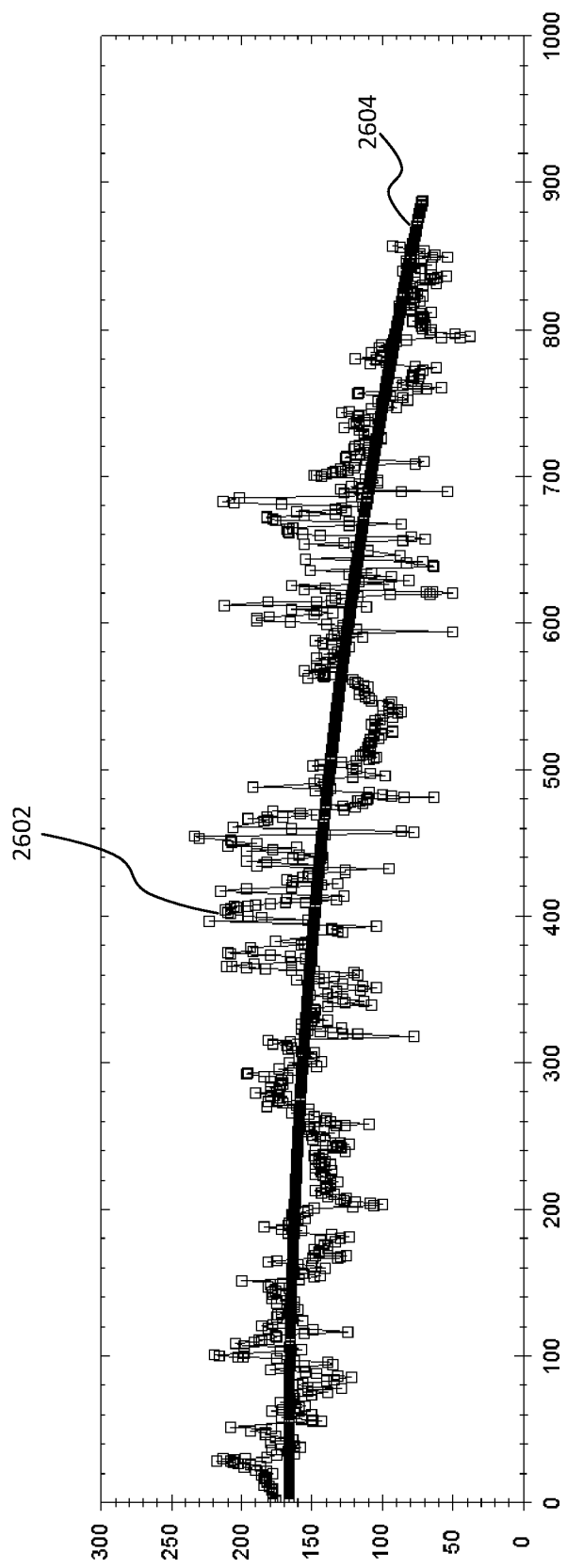
FIG. 26 is an illustration of an embodiment of a plot comparing a gyro minus compass heading and a drift estimate for the path of FIG. 25.
Figure 27:
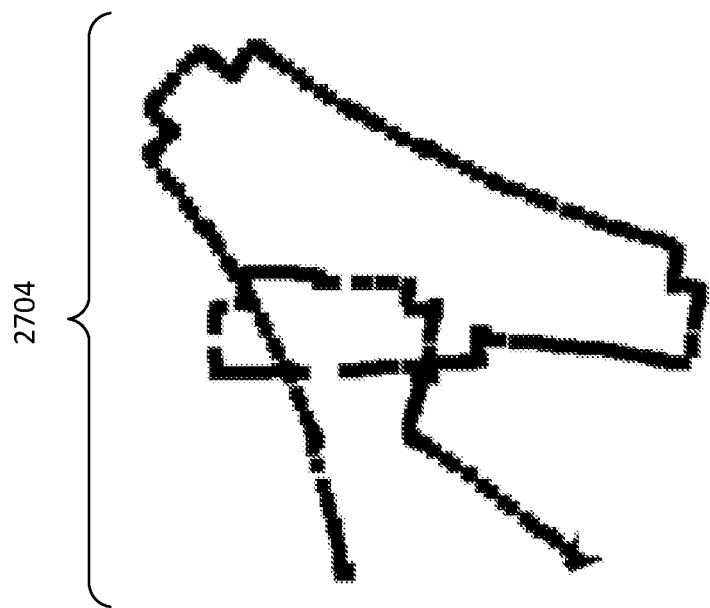
FIG. 27 is an illustration of an embodiment of a plot comparing a third path and a drift corrected version of the third path where entropy increases.
Figure 27:
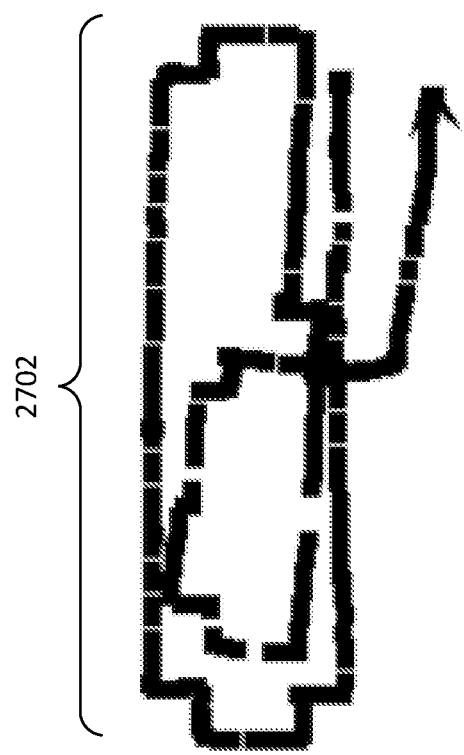
Figure 28:
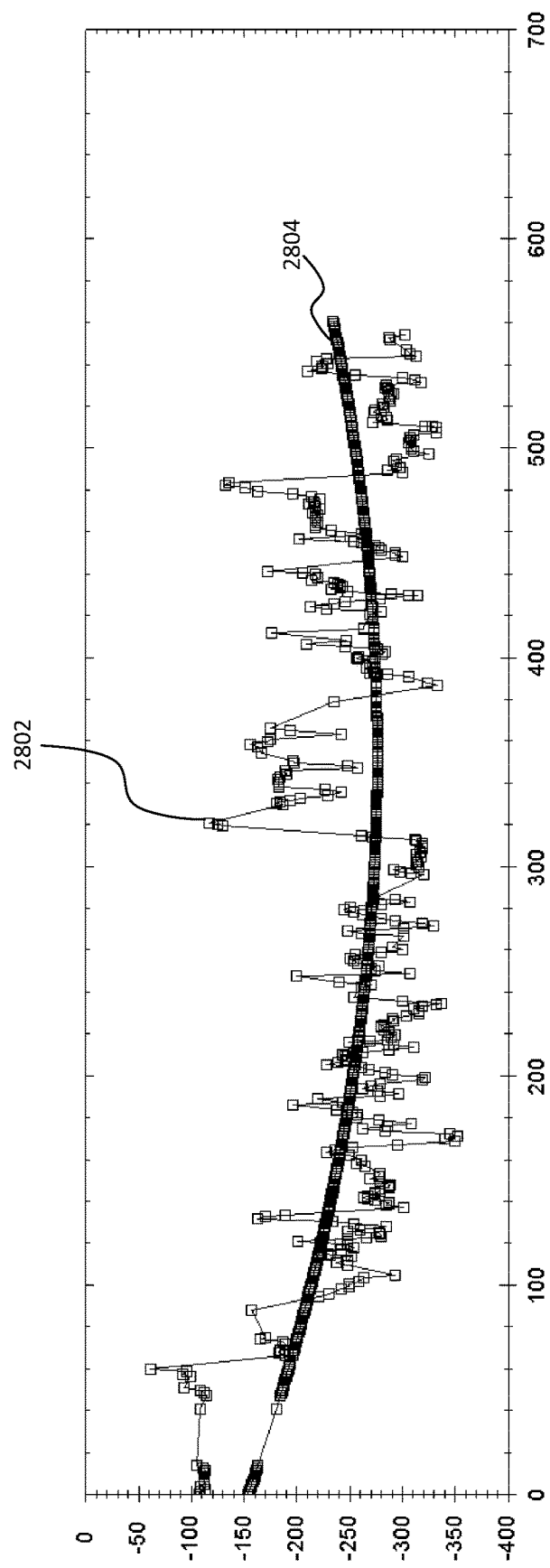
FIG. 28 is an illustration of an embodiment of a plot comparing a gyro minus compass heading and a drift estimate for the path of FIG. 27.
Figure 29:
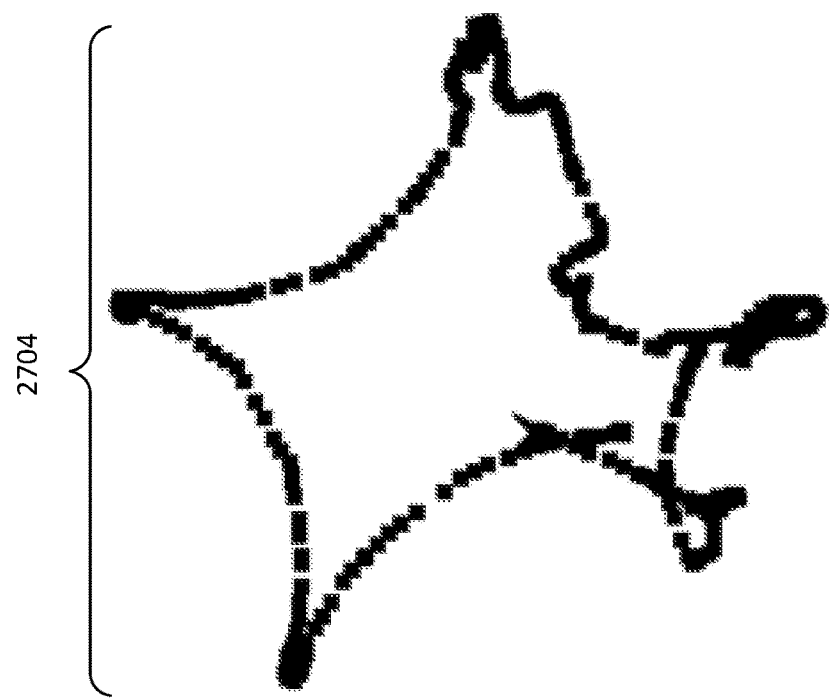
FIG. 29 is an illustration of an embodiment of a plot comparing a fourth path and a drift corrected version of the fourth path where entropy increases.
Figure 29:
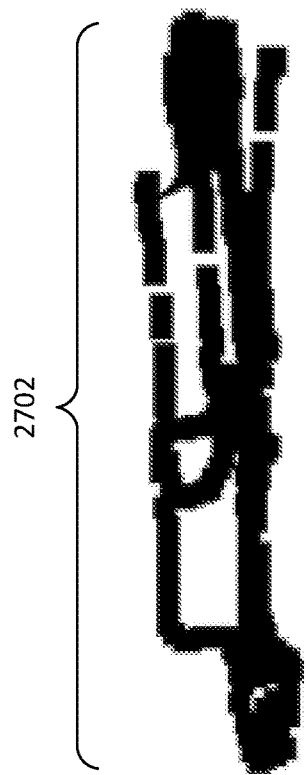

An example of the pseudo entropy solution is illustrated in FIG. 23, where path 2302 represents an original path with an entropy of 7.7897. The lower entropy solution of path 2304, having an entropy of 7.3882, has fewer dominant headings. FIG. 24 further illustrate the same path example, showing the gyro minus compass difference as 2402 and the gyro error estimate 2404 with entropy reduces as expected. A second example is illustrated in FIGS. 25 and 26. In FIG. 25, an original sample path is shown as 2502 without drift correction and an entropy of 9.3507, and the same path 2504 with drift correction and an entropy lowered to 6.7861. In FIG. 26, the compass difference 2602 and the drift estimate for the same path are shown with entropy reduced as expected. The first two examples illustrate a fairly significant amount of path overlap as well as strait path segments, which are rewarded by the pseudo entropy engine's algorithm.

Figure 30:
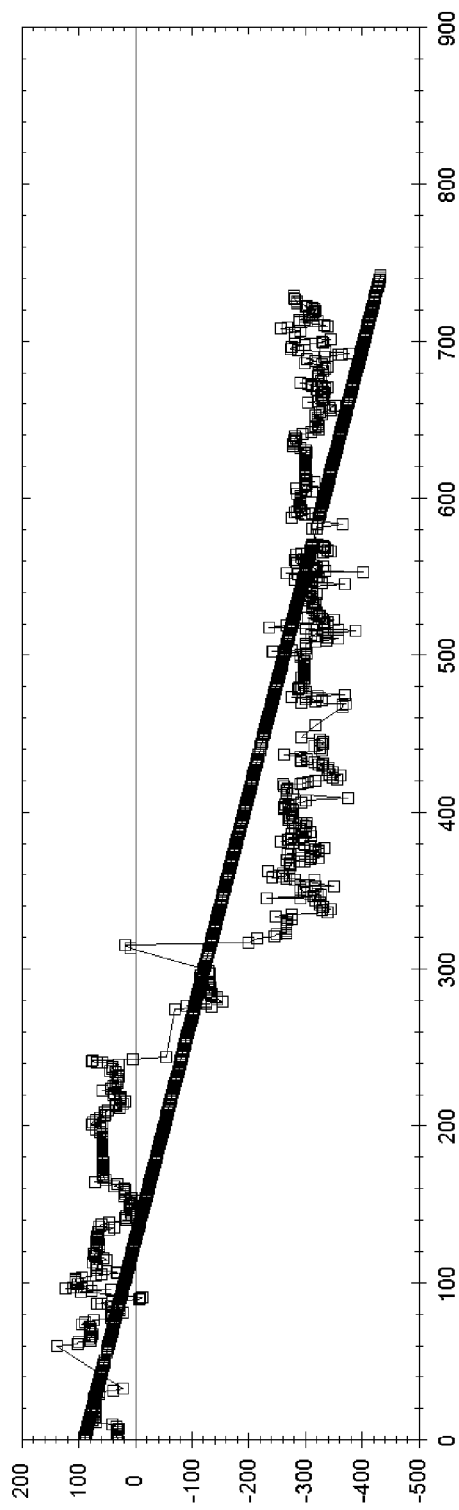
FIG. 30 is an illustration of an embodiment of a plot comparing a gyro minus compass heading and a drift estimate for the path of FIG. 29.

Two different examples are illustrated in FIGS. 27-30, in which the drift engine fails to improve the drift. As show in FIG. 27, the original path 2702 is shown on the left and the drift corrected path 2704 is on the right. Entropy for path 2702 was 5.0985, but increased to 6.6354. As can be expected, the pseudo entropy check based the compass difference 2802 and drift estimate for the same path, shown in FIG. 28, reflects the same, and as a result the drift computations may be rejected. Likewise, in FIG. 29, the original path 2902 is shown on the left and the drift corrected path 2904 is shown on the right, with entropy increases from 3.0706 to 4.3850. The entropy check illustrated in FIG. 30 shows that the applied drift decreases tracking performance while the entropy value was increased. Consequently, drift correction was again rejected.

Method for Global Rotation Estimation Using Spatial Magnetometer Filtering

Because magnetic sensor data can be poor in certain locations, a spatial magnetic filter has also been developed to provide an additional measure of protection from having a location with poor magnetic data disproportionally affect the computed heading. For example, a path may have segments or portions in areas with some magnetic field distortion, but other portions or segments in areas with an undistorted field. This is a common scenario, for example, going to the mall or the office—in this scenario people walk a short distance from their cars to the building, where there are areas of significant distortion. Even if the poor sensor data has reduced weight because of the computed magnetic field confidence, if each measurement is allowed to contribute otherwise equally to the final heading, then the weight of the contribution from that a location becomes a function of the time the user spends at that location. This could be problematic.

Figure 31:
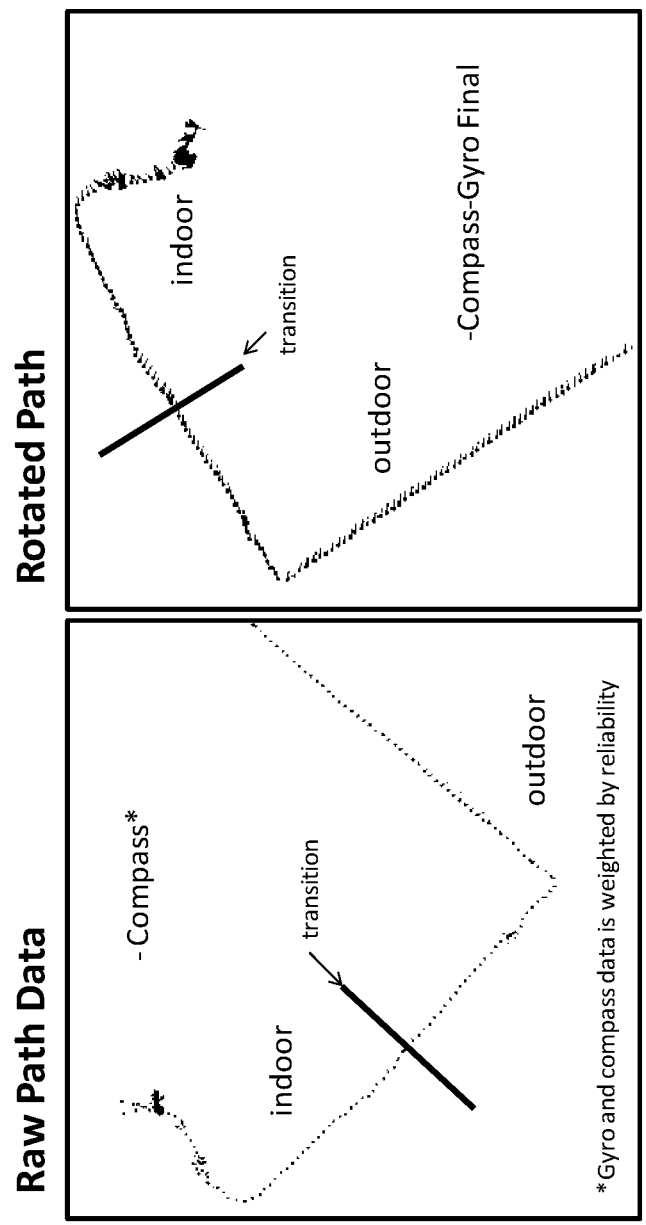
FIG. 31 is an illustration of an embodiment of spatial gyro and compass heading data weighted overalaid on an original patent and a rotated inertial path.

To better handle this issue, a spatial filter has been developed that distributes the weight of the magnetic field contribution equally over a spatial grid. FIG. 31 shows an example of spatially distributed compass and gyro heading data overlaid on the inertial path. The left side of FIG. 31 shows the raw gyro and compass heading vector data, which is weighted by the computed magnetic heading confidence described above. Notice that the confidence is low for much of the data inside the building and even near the building. The right side of FIG. 31 shows the path with the heading computed using the spatial filter described below. In this side, the final compass-gyro heading vector is shown without weighting. For portions of the path with good heading information, this vector should have 0 heading (indicated by pointing to the right).

An example implementation of this technique is as follows:

Step 1: Each grid location may be assigned only one heading. In this implementation a 0.5 meter grid is used. The weighted average of the magnetic heading minus the gyro heading is computed for all points within the 0.5 meter square, $G_{x,y}$, is assigned to the grid location. The weight is reflective of the magnetic reliability as computed above. Note that with drift removed and with a well calibrated magnetometer, the magnetic headings minus the gyro heading should be near zero.

$$(c-g)_{x,y} = \sum_{k|x,y \in G_{x,y}} r(k)*(c(k)-g(k))$$

note that the weighted vector $$r(k)*(c(k)-g(k))$$

is a vector of length between 0 and 1.

Step 2: The average of spatially distributed data is computed and a gyro initial rotation is found that minimizes this value. The rotation that minimizes the average of spatially distributed magnetic heading minus the gyro heading represents the final best guess for global rotation of the inertial path.

$$\min_{g(0)} \sum_{x,y} (c-g)_{x,y}$$

Step 3: An error measure on the global heading estimate is provided by the weighted standard deviation of the spatially distributed headings, $\sigma_R$. This can be used to limit the amount the solvers can rotate the path from this initial estimate.

$$\sigma_R = \sqrt{-\ln\left(\sum_{x,y}(c(k)-g(k))_{x,y} \bigg/ \left(\sum_{x,y} r \bigg/ \sum_{x,y} 1\right)\right)}$$

Method for Limiting the Solution Space of Constraint Based Optimization

Constraints on the navigation solution are obtained from GPS, ranging to anchors, user corrections and check-ins, etc. The navigation system uses constraint based optimization to compute a globally optimal solution for location initialization, rotation, path scale, and drift by tweaking these four parameters. Initialization of the drift and rotation are computed for example as described above. Limits are placed on the amount that parameters are allowed to change.

There are several ways to limit the rotation of the path. As described above, the weighted standard deviation of compass values may be calculated. The rotation is limited by $\pm n\sigma_R$, where n=3 is used to give a bound which contains the heading about 99% of the time assuming approximately Gaussian distribution. This is more important when the magnetic field is clean and the compass computed heading is good. In this case, it enforces tight bounds on possible rotations. The heading will likely not have Gaussian distribution in the case where there is significant magnetic field distortion; however, in that case, $\sigma_R$ will be large and so the bound will not impose much of a restriction as desired.

Figure 32:
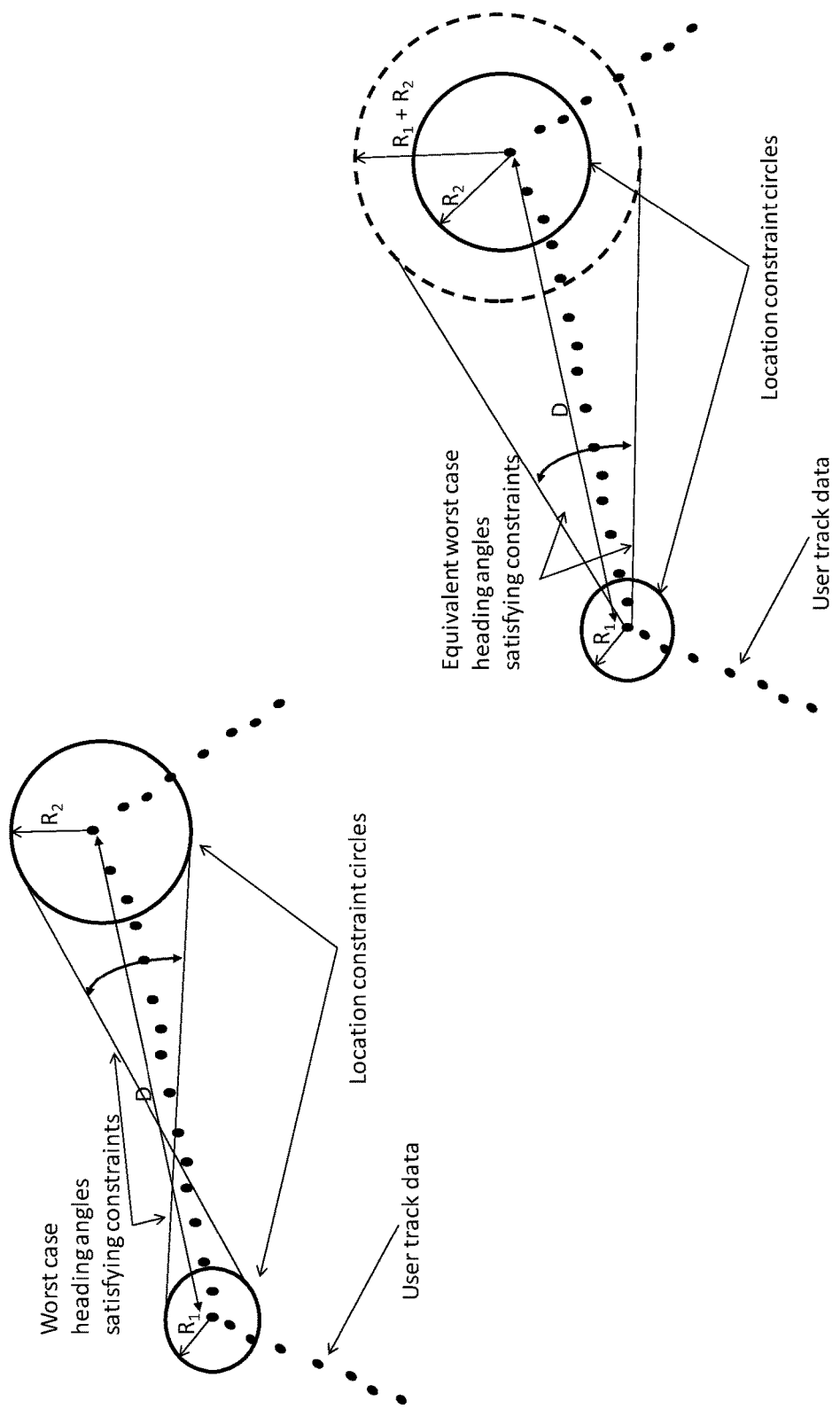
FIG. 32 is an illustration of an embodiment of rotation and scale limits due to constraints.

Additionally, as illustrated in FIG. 32, which shows two equivalent techniques for finding the angle bounds, if an inertial path travels a distance D in a straight line with endpoints bounded by constraints with radius $R_1$ and $R_2$, then rotation is bounded by analyzing the worst case angles of lines that are tangent to both constraint circles, as follows:

$$2 \arcsin((R_1+R_2)/D)$$

As for scale, if an inertial path travels a distance D in a straight line with endpoints bounded by constraints with radii $R_1$ and $R_2$, then global scale bounds are determined by computing:

$$(D+R_1+R_2)/(\text{Length of Inertial Segment})$$

and $$(D-R_1-R_2)/(\text{Length of Inertial Segment}).$$

Drift is constrained to be within the bounds of the device specification. It can also be constrained to lie within $\pm n\sigma_m$, where n is an integer. n=3 has been used, requiring the drift to lie within three times the standard deviation of the computed drift, as noted above.

For constraints that are not met, computation of a local modification of the path to satisfy these remaining constraints is completed using a physics based particle solver.

Embodiments described herein include a method for calibrating in real-time a body-worn magnetic sensor, the method comprising capturing magnetic data from the magnetic sensor when the sensor moves along a 360 degree spun path, if the captured magnetic data fails to produce a circle contained in an x-y plane, fitting a sphere to the captured magnetic data, determining x-axis, y-axis and z-axis offsets for the captured magnetic data fit to the sphere based on a center of the sphere, removing the z-axis offsets, and using the x-axis offsets and y-axis offsets to calibrate the magnetic sensor.

Embodiments described herein include a computing system for computing an indicator of a magnetic heading reliability of a magnetic sensor, the computing system comprising a processor, a memory communicatively coupled to the processor, the memory bearing instructions that, when executed on the processor, cause the computing system to at least, determine an orientation of the magnetic sensor at a first location, generate a filter that transforms the orientation between two reference frames, measure a first vector associated with the magnetic field of Earth at the first location, when a second location of the magnetic sensor is detected, process the first vector through the filter to generate a virtual vector, measure a second vector associated with the magnetic field of Earth at the second location, and calculate the indicator of the magnetic heading reliability at the second location based on a comparison of the virtual vector and the second vector.

The embodiment described herein, wherein the computing system comprises the magnetic sensor.

The embodiment described herein, wherein the first vector associated with the magnetic field comprises magnitude, stability, and inclination values of the magnetic field of Earth at the first location.

Embodiment described herein include a computer readable storage medium comprising instructions that, when executed on a computing system configured to calculate a gyro heading drift associated with a magnetic sensor and a gyro sensor, cause the computing system to at least transform gyro data and compass data into a navigation frame, compute a compass heading and a gyro heading in the navigation frame, determine a first drift based on a best fit line of the compass heading and the gyro heading in the navigation frame, sort the compass data into bins based on compass angle, determine a second drift based on an average slope of best fit lines of the gyro data subtracted from the compass data in each bin, and calculate the gyro heading drift based on the first drift and the second drift.

The embodiment described herein, wherein the computing system comprises the magnetic sensor and the gyro sensor.

The embodiment described herein, wherein the best fit lines are generated based on a Hough transform.

The embodiment described herein, wherein a slope of a best fit line is attributed to drift.

The embodiment described herein, wherein, for each bin, the best fit line is weighted based on a compass reliability.

The embodiment described herein, wherein the instruction further cause the computer system to at least compute a confidence in the gyro heading drift based on entropy of a path taken by the magnetic sensor and the gyro sensor, maintain the gyro heading drift if entropy decreases, and reject the gyro heading drift if entropy increases.

The embodiment described herein, wherein the confidence is based on overlap in the path and straight segments in the path.

Embodiment described herein include a global rotation estimation obtained by the steps of determining a path of a magnetic sensor and gyro sensor in motion in an environment based on magnetic data received from the magnetic sensor and gyro data received from the gyro sensor, breaking the path into a plurality of grids, for each grid, computing a heading based on magnetic headings and gyro headings at locations within the path in each grid, determining an average heading across the plurality of grids, and setting the global rotation estimation as a value that minimizes the average heading.

The embodiment described herein, wherein the heading of a grid of the plurality of grids is a weighted average of the magnetic headings and gyro headings at the locations within the path in the grid.

The embodiment described herein, wherein the steps further comprise applying an error measure to the average heading such that global rotation estimation accounts for the error.

The embodiment described herein, wherein the error comprises a standard deviation of the headings of the plurality of grids.

The techniques described above can be implemented on a computing device associated with a user (e.g., gyroscope and accelerometer sensors implemented on a device worn by the user), a plurality of computing devices associated with a plurality of users, a server in communication with the computing device(s) (e.g., a server configured to calibrate the gyroscope and accelerometer sensors of the device worn by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. The following figure describes a computing system that includes hardware modules, software module, and a combination thereof and that can be implemented as the computing device and/or as the server.

Figure 33:
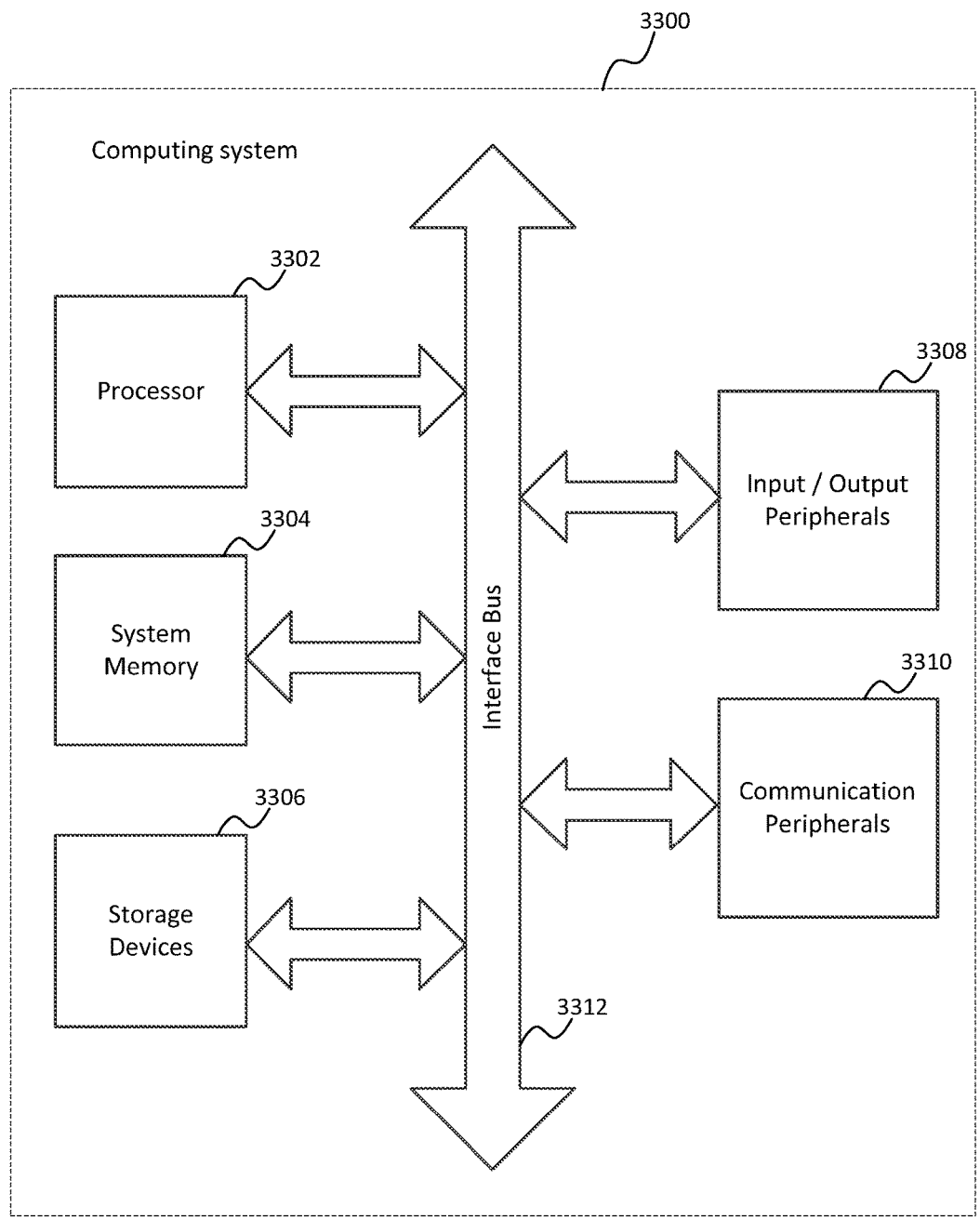
FIG. 33 is an illustration of an embodiment of a computer system.

In a basic configuration, as illustrated in FIG. 33, the computing system 3300 may include at least a processor 3302, a system memory 3304, a storage device 3306, input/output peripherals 3308, communication peripherals 3310, and an interface bus 3312. The interface bus 3312 is configured to communicate, transmit, and transfer data, controls, and commands between the various components of the computer system, such as an electronic device. The system memory 3304 and the storage device 3306 comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory 3304 comprises an operation system and applications. The processor 3302 is configured to execute the stored instructions and can comprise, for example, a logical processing unit, a microprocessor, a digital signal processor, and the like.

The system memory 3304 and the storage device 3306 may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system 3300.

Further, the input and output peripherals 3308 include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals 3308 may be connected to the processor through any of the ports coupled to the interface bus.

The user interfaces can be configured to allow a user of the computing system 3300 to interact with the computing system 3300. For example, the computing system 3300 may include instructions that, when executed, cause the computing system 3300 to generate a user interface that the user can use to provide input to the computing system 3300 and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system 3300. In another embodiment, the user interface may be hosted on a remote computing system (not shown but accessible through communication peripherals 3310, and rendered at the computing system 3300. For example, the server may generate the user interface and may transmit information related thereto to the computing device 3300 that, in turn, renders the user interface to the user. The computing device 3300 may, for example, execute a browser or an application that exposes an application program interface (API) at the server to access the user interface hosted on the server.

Finally, the communication peripherals 3310 of the computing system 3300 are configured to facilitate communication between the computing system 3300 and other computing systems (e.g., between the computing device and the server) over a communications network. The communication peripherals 3312 include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A non-transitory computer readable storage medium comprising instructions that, when executed on a computing system of a person mounted portable device having a magnetic sensor for a compass and a gyro sensor, cause the computing system to at least:
   calculate a tracking path for the portable device by obtaining tracking data along the tracking path comprising a plurality of tracking points, the tracking data including gyro data and compass data associated with the portable device;
   transform the gyro data and the compass data into a navigation frame to compensate for tilt of the portable device;
   compute a compass heading based on the compass data and a gyro heading based on the gyro data in the navigation frame;
   determine a first drift based on a best fit line of a difference between the compass heading and the gyro heading in the navigation frame;
   estimate compass calibration error by determining a second drift comprising:
      sorting the compass data into bins based on compass angles associated with the compass data;
      determining, for each bin, a weighted best fit line based on a compass reliability; and
      determining an average slope of the weighted best fit lines of the gyro data subtracted from the compass data in each bin;
   estimate gyro calibration error by calculating a gyro heading drift based on the first drift and the second drift;
   update the gyro data and the compass data based on the estimated gyro calibration error; and
   correct at least a portion of the tracking path using the updated gyro data and compass data.

2. The computer readable storage medium of claim 1, wherein the best fit lines are generated based on a Hough transform.

3. The computer readable storage medium of claim 1, wherein a slope of a best fit line is attributed to drift.

4. The computer readable storage medium of claim 1, wherein the instruction further cause the computer system to at least:
   compute a confidence in the gyro heading drift based on entropy of a path taken by the magnetic sensor and the gyro sensor;
   maintain the gyro heading drift if entropy decreases; and
   reject the gyro heading drift if entropy increases.

5. The computer readable storage medium of claim 4, wherein the confidence is based on overlap in the path and straight segments in the path.

6. The computer readable storage medium of claim 1, wherein the instructions further cause the computer system to at least:
   filter out the compass data with low reliability prior to when the instructions cause the computer system to transform gyro data and compass data into the navigation frame.

7. The computer readable storage medium of claim 1, wherein the instructions that cause the computer system to calculate the gyro heading drift based on the first drift and the second drift further cause the computer system to determine x-axis, y-axis, and z-axis offsets of the compass data and the gyro data.

8. The computer readable storage medium of claim 7, wherein the instructions that cause the computer system to determine x-axis, y-axis, and z-axis offsets of the compass data and the gyro data further cause the computer system to remove at least one of the x-axis, the y-axis, and the z-axis offsets.

9. The computer readable storage medium of claim 1, wherein the instructions further cause the computer system to display in a graphical user interface (GUI) the gyro heading and the compass heading.

10. A computer implemented method, the method comprises:
    calculating a tracking path for a person mounted portable device having a magnetic sensor for a compass and a gyro sensor;
    obtaining tracking data for the portable device along a tracking path comprising a plurality of tracking points, the tracking data including gyro data and compass data associated with the portable device;
    transforming the gyro data and the compass data into a navigation frame to compensate for tilt of the portable device;
    computing a compass heading from the compass data, and a gyro heading from the gyro data in the navigation frame;
    determining a first drift based on a best fit line of the difference between the compass heading and the gyro heading in the navigation frame;
    estimating compass calibration error by determining a second drift comprising:
       sorting the compass data into bins based on corresponding compass angles;
       determining, for each bin, a weighted best fit line based on a compass reliability;
       determining an average slope of the weighted best fit lines of the gyro data subtracted from compass data in each bin;
    estimating gyro calibration error by calculating a gyro heading drift based on the first drift and the second drift;
    updating the gyro data and the compass data based on the estimated gyro calibration error; and
    correcting at least a portion of the tracking path using the updated gyro data and compass data.

11. The method of claim 10, wherein the best fit lines are generated based on a Hough transform.

12. The method of claim 10, wherein a slope of a best fit line is attributed to drift.

13. The method of claim 10, wherein the method further comprises:
    computing a confidence in the gyro heading drift based on entropy of a path taken by the magnetic sensor and the gyro sensor;
    maintaining the gyro heading drift if entropy decreases; and
    rejecting the gyro heading drift if entropy increases.

14. The method of claim 13, wherein the confidence is based on overlap in the path and straight segments in the path.

15. The method of claim 10, wherein the method further comprises:
    filtering out the compass data with low reliability.

16. The method of claim 10, wherein calculating the gyro heading drift based on the first drift and the second drift further comprises:
   determining x-axis, y-axis, and z-axis offsets of the compass data and the gyro data; and
   removing at least one of the x-axis, the y-axis, and the z-axis offsets.

17. The method of claim 10, further comprising:
   displaying the gyro heading and the compass heading in a graphical user interface (GUI).

* * * * *